US012769112B2

(12) United States Patent
Kakidani et al.

(10) Patent No.: US 12,769,112 B2
(45) Date of Patent: Oct. 20, 2026

(54) IMAGING DEVICE, CONTROL METHOD, AND PROGRAM

(71) Applicant: Sony Group Corporation, Tokyo (JP)

(72) Inventors: Kei Kakidani, Kanagawa (JP); Takuma Tanae, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 189 days.

(21) Appl. No.: 18/700,044

(22) PCT Filed: Oct. 19, 2022

(86) PCT No.: PCT/JP2022/038982
§ 371 (c)(1),
(2) Date: Apr. 10, 2024

(87) PCT Pub. No.: WO2023/085025
PCT Pub. Date: May 19, 2023

(65) Prior Publication Data

US 2024/0337826 A1 Oct. 10, 2024

(30) Foreign Application Priority Data

Nov. 12, 2021 (JP) ................................. 2021-185113

(51) Int. Cl.
*G02B 26/02* (2006.01)
*G02B 7/00* (2021.01)
*G03B 11/00* (2021.01)

(52) U.S. Cl.
CPC ........... *G02B 26/023* (2013.01); *G02B 7/006* (2013.01); *G03B 11/00* (2013.01)

(58) Field of Classification Search
CPC ...... G02B 26/023; G02B 7/006; G03B 11/00; G03B 17/02; H04N 23/55
See application file for complete search history.

(56) References Cited

U.S. PATENT DOCUMENTS

2008/0297647 A1* 12/2008 Okabe .................... G03B 17/14 348/340

FOREIGN PATENT DOCUMENTS

JP 2001-086399 A 3/2001
JP 2002-174551 A 6/2002
JP 2008-258835 A 10/2008
JP 2018-189671 A 11/2018

(Continued)

*Primary Examiner* — Mariam Qureshi
(74) *Attorney, Agent, or Firm* — Paratus Law Group, PLLC

(57) ABSTRACT

An imaging device includes: an imaging element; a neutral density (ND) filter unit including a plurality of filter holders, each of the filter holders being mounted with a plurality of optical ND filters having different transmittances and being able to selectively insert the optical ND filters into an incident optical path for the imaging element; and a control unit. The control unit can variably set the transmittance of the ND filter unit by performing drive control of switching the optical ND filter to be inserted into the incident optical path for each of the plurality of filter holders, and in a case where driving of the plurality of filter bodies is required for switching to a target transmittance, performs control such that the plurality of filter holders to be driven is simultaneously displaced in a direction and a displacement amount equal to each other.

15 Claims, 31 Drawing Sheets

(56) References Cited

FOREIGN PATENT DOCUMENTS

| | | | |
|---|---|---|---|
| JP | 2020-052378 | A | 4/2020 |
| WO | WO 2019/155908 | A1 | 8/2019 |
| WO | WO-2019171723 | A1 | 9/2019 |

* cited by examiner

FIG. 7

INCREASE ↕ DECREASE

| TOTAL TRANSMITTANCE | FILTER DISK 6A | FILTER DISK 6B |
|---|---|---|
| Clear | Clear | Clear |
| 1/2 | Clear | 1/2 |
| 1/4 | Clear | 1/4 |
| 1/8 | 1/8 | Clear |
| 1/16 | 1/8 | 1/2 |
| 1/32 | 1/8 | 1/4 |
| 1/64 | 1/64 | Clear |
| 1/128 | 1/64 | 1/2 |
| 1/256 | 1/64 | 1/4 |

FIG. 29

INCREASE ↕ DECREASE

| TOTAL TRANSMITTANCE | FILTER DISK 6A | FILTER DISK 6B |
|---|---|---|
| Clear | Clear | Clear |
| 2/3 | Clear | 2/3 |
| 1/2 | Clear | 1/2 |
| 1/3 | Clear | 1/3 |
| 1/4 | 1/4 | Clear |
| 1/6 | 1/4 | 2/3 |
| 1/8 | 1/4 | 1/2 |
| 1/12 | 1/4 | 1/3 |
| 1/16 | 1/16 | Clear |
| 1/24 | 1/16 | 2/3 |
| 1/32 | 1/16 | 1/2 |
| 1/48 | 1/16 | 1/3 |
| 1/64 | 1/64 | Clear |
| 1/96 | 1/64 | 2/3 |
| 1/128 | 1/64 | 1/2 |
| 1/192 | 1/64 | 1/3 |

FIG. 31

INCREASE ↕ DECREASE

| TOTAL TRANSMITTANCE | FILTER DISK 6A | FILTER DISK 6B |
|---|---|---|
| Clear | Clear | Clear |
| 3/4 | Clear | 3/4 |
| 2/3 | Clear | 2/3 |
| 1/2 | Clear | 1/2 |
| 1/3 | Clear | 1/3 |
| 1/4 | 1/4 | Clear |
| 3/16 | 1/4 | 3/4 |
| 1/6 | 1/4 | 2/3 |
| 1/8 | 1/4 | 1/2 |
| 1/12 | 1/4 | 1/3 |
| 1/16 | 1/16 | Clear |
| 3/64 | 1/16 | 3/4 |
| 1/24 | 1/16 | 2/3 |
| 1/32 | 1/16 | 1/2 |
| 1/48 | 1/16 | 1/3 |
| 1/64 | 1/64 | Clear |
| 3/256 | 1/64 | 3/4 |
| 1/96 | 1/64 | 2/3 |
| 1/128 | 1/64 | 1/2 |
| 1/192 | 1/64 | 1/3 |
| 1/256 | 1/256 | Clear |
| 3/1024 | 1/256 | 3/4 |
| 1/384 | 1/256 | 2/3 |
| 1/512 | 1/256 | 1/2 |
| 1/768 | 1/256 | 1/3 |

IMAGING DEVICE, CONTROL METHOD, AND PROGRAM

CROSS REFERENCE TO PRIOR APPLICATION

This application is a National Stage Patent Application of PCT International Patent Application No. PCT/JP2022/038982 (filed on Oct. 19, 2022) under 35 U.S.C. § 371, which claims priority to Japanese Patent Application No. 2021-185113 (filed on Nov. 12, 2021), which are all hereby incorporated by reference in their entirety.

TECHNICAL FIELD

The present technology relates to an imaging device, a control method, and a program, and particularly relates to a technical field regarding control of an ND filter.

BACKGROUND ART

In the field of imaging devices, there is an imaging device that uses a neutral density (ND) filter to suppress an amount of light incident on an imaging element.

Patent Documents 1 and 2 below disclose a configuration example in which two ND filter disks are mounted.

CITATION LIST

Patent Document

Patent Document 1: WO2019/155908

Patent Document 2: Japanese Patent Application Laid-Open No. 2020-52378

SUMMARY OF THE INVENTION

Problems to be Solved by the Invention

In the ND filter disk (hereinafter, referred to as a "filter disk"), the ND filters are disposed in the circumferential direction, and the ND filter to be inserted into the incident optical path to the imaging element is switched by rotating the filter disk.

In a case where a plurality of filter disks is mounted, when each filter disk is rotated, the movement of a shadow appearing on the monitor display due to the rotation of the filter disk is irregularly visually recognized, and there are cases where a user feels discomfort that the transmittance switching operation and the actual operation of the mechanism do not match with each other. As a result, the user feels this phenomenon as an erroneous operation.

Therefore, the present disclosure proposes a technique that enables the user to be provided with operability without discomfort in a case where a plurality of filter holders such as filter disks is mounted.

Solutions to Problems

An imaging device according to the present technology includes: an imaging element; an ND filter unit including a plurality of filter holders, each of the filter holders being mounted with a plurality of optical ND filters having different transmittances and being able to selectively insert the optical ND filters into an incident optical path for the imaging element; and a control unit that can variably set the transmittance of the ND filter unit by performing drive control of switching the optical ND filter to be inserted into the incident optical path for each of the plurality of filter holders, and in a case where driving of the plurality of filter holders is required for switching to a target transmittance, performs control such that the plurality of filter holders to be driven is simultaneously displaced in the same direction by the same displacement amount.

At the time of driving the plurality of filter holders, by simultaneously displacing the plurality of filter holders in the same direction by the same displacement amount, a shadow of each of the filter holders reflected in the imaging element does not become separated from other shadows.

BRIEF DESCRIPTION OF DRAWINGS

FIG. 7 is an explanatory view of transmittance switchable by an ND filter unit according to the embodiment.

FIG. 29 is an explanatory view of another example of transmittance switchable by the ND filter unit according to the embodiment.

FIG. 31 is an explanatory view of yet another example of transmittance switchable by the ND filter unit according to the embodiment.

MODE FOR CARRYING OUT THE INVENTION

Hereinafter, an embodiment is described in the following order.

<1. Configuration of imaging device>

<2. Configuration of ND filter unit>

<3. Rotation operation of filter disk>

<4. First control processing example>

<5. Second control processing example>

<6. Other configuration examples of ND filter unit>

<7. Summary and modifications>

1. Configuration of Imaging Device

A configuration of an imaging device 10 according to an embodiment is described with reference to FIGS. 1 to 4.

Note that the application range of the present technology is not limited to a video camera as exemplified. The present technology can be applied not only to, for example, a video camera and a still camera. Furthermore, the present technology can be widely applied to various imaging devices such as cameras for various applications such as business use, general use, and monitoring.

Furthermore, an example of a lens detachable imaging device will be described below, but the present technology is not limited thereto, and the imaging device may be a lens integrated imaging device.

Figure 1:
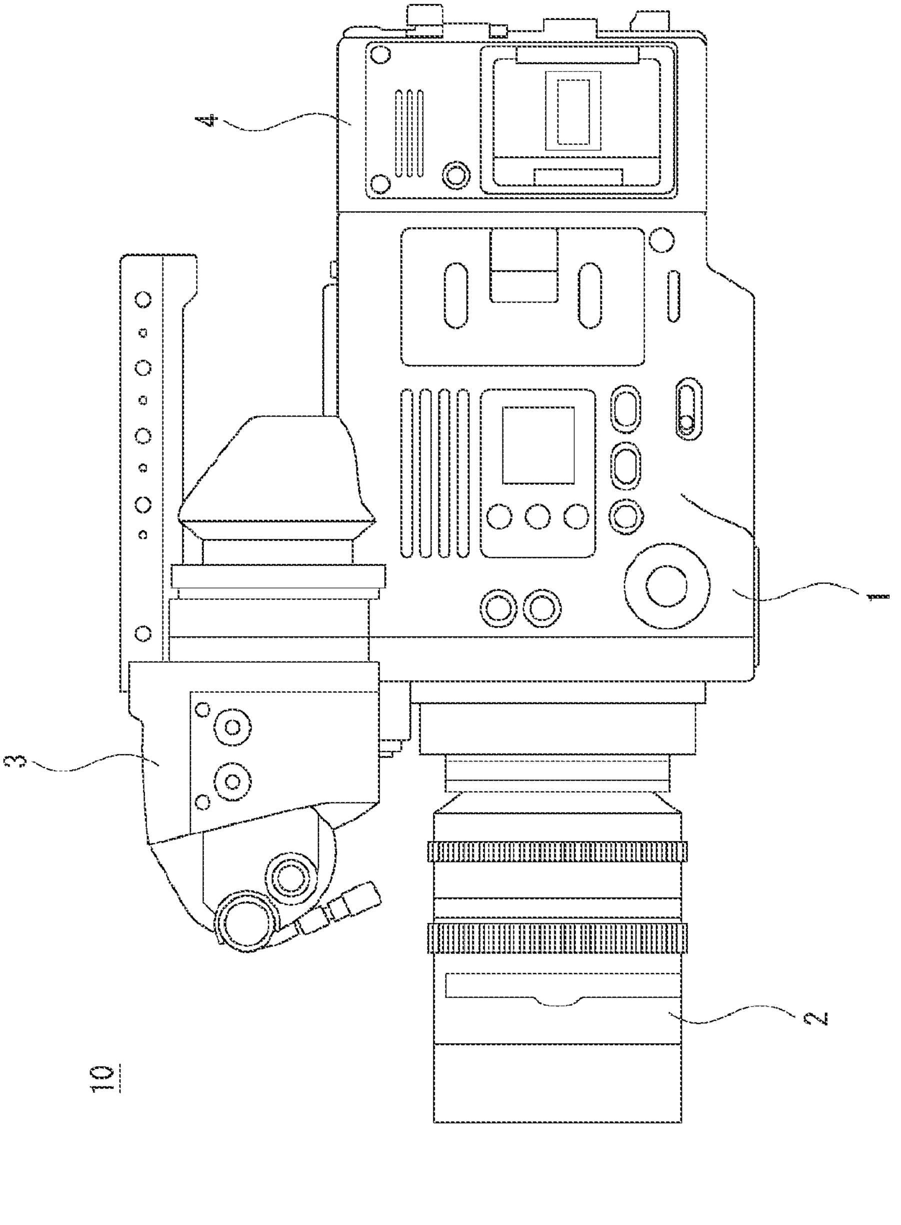
FIG. 1 is a side view of an imaging device according to an embodiment of the present technology.

FIG. 1 illustrates a side view of the imaging device 10.

The imaging device 10 includes a main body part 1, a lens barrel 2, a finder unit 3, a battery unit 4, and the like.

The lens barrel 2 is an interchangeable lens that can be attached to the main body part 1.

Figure 2:
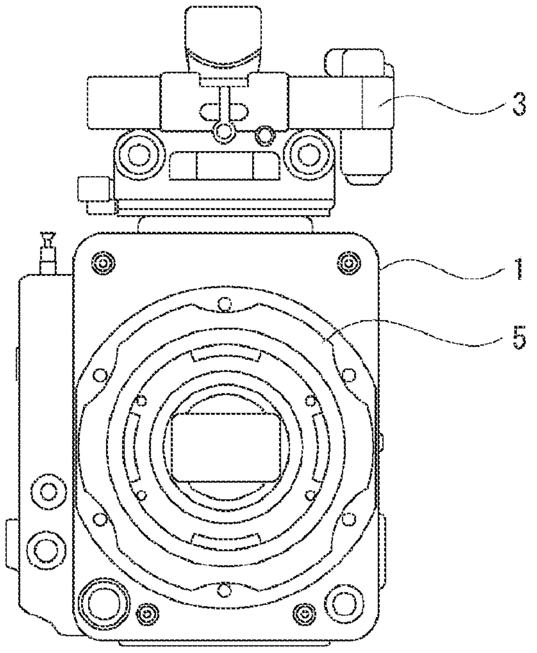
FIG. 2 is a front view of a main body part of the imaging device according to the embodiment.

FIG. 2 is a front view of the main body part 1 in a state where the lens barrel 2 is removed, and various lens barrels 2 can be attached to a lens mounting part 5 provided in the main body part 1.

Furthermore, the finder unit 3 and the battery unit 4 are also configured to be detachable from the main body part 1.

Figure 3:
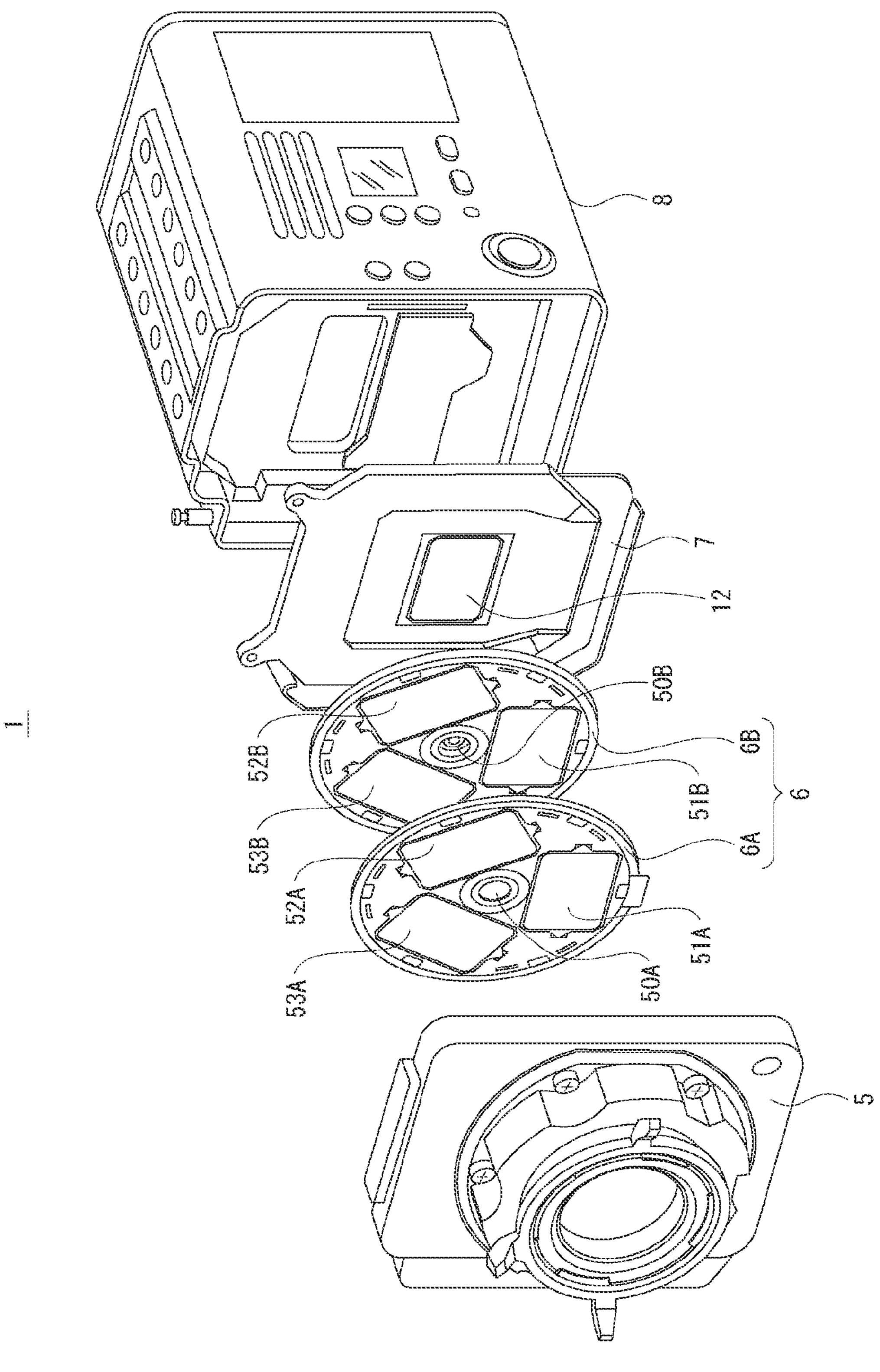
FIG. 3 is an exploded perspective view of the main body part of the imaging device according to the embodiment.

FIG. 3 is an exploded perspective view of the main body part 1 of the imaging device 10. In this drawing, the lens mounting part 5, an ND filter unit 6, an imager unit 7, and a main body housing 8 are illustrated.

An imaging element 12 is mounted on the imager unit 7. A captured image signal obtained by the imaging element 12 is processed by various processing circuits provided in the main body housing 8.

In the present embodiment, two filter disks 6A and 6B are provided as the ND filter unit 6 disposed between the imager unit 7 and the lens mounting part 5.

Although illustration of the mechanism is omitted, the filter disks 6A and 6B are rotatable with central axis parts 50A and 50B as rotation axes, respectively. The filter disks are not particularly limited for the rotation operation and are configured to be freely rotatable clockwise and counter-clockwise (so-called endless rotation).

Although details will be described later, each of the filter disks 6A and 6B includes three optical ND filters. Each optical ND filter is a fixed transmittance optical ND filter having a fixed transmittance.

Optical ND filters 51A, 52A, and 53A are mounted on the filter disk 6A. The optical ND filters 51A, 52A, and 53A are disposed side by side at equal angular intervals in the circumferential direction. That is, the optical ND filters are disposed side by side so as to have an angular relationship of every 120 degrees.

Optical ND filters 51B, 52B, and 53B are mounted on the filter disk 6B. The optical ND filters 51B, 52B, and 53B are also disposed side by side at equal angular intervals in the circumferential direction. That is, the optical ND filters are disposed side by side so as to have an angular relationship of every 120 degrees.

The optical ND filters 51A, 52A, and 53A are filters having different transmittances from each other.

The optical ND filters 51B, 52B, and 53B also are filters having different transmittances from each other.

In the state of this drawing, in the filter disks 6A and 6B, the optical ND filter 51A and the optical ND filter 51B are disposed in the optical path of incident light incident on the imaging element 12.

In this case, a light reduction function is exerted by both the optical ND filter 51A and the optical ND filter 51B on the incident light.

The optical ND filters 51A, 52A, and 53A to be inserted into the incident optical path can be switched by rotating the filter disk 6A.

Similarly, the optical ND filters 51B, 52B, and 53B to be inserted into the incident optical path can be switched by rotating the filter disk 6B.

Various transmittances can be realized in the ND filter unit 6 by selecting the optical ND filter to be inserted into the incident optical path in each of the filter disks 6A and 6B.

Figure 4:
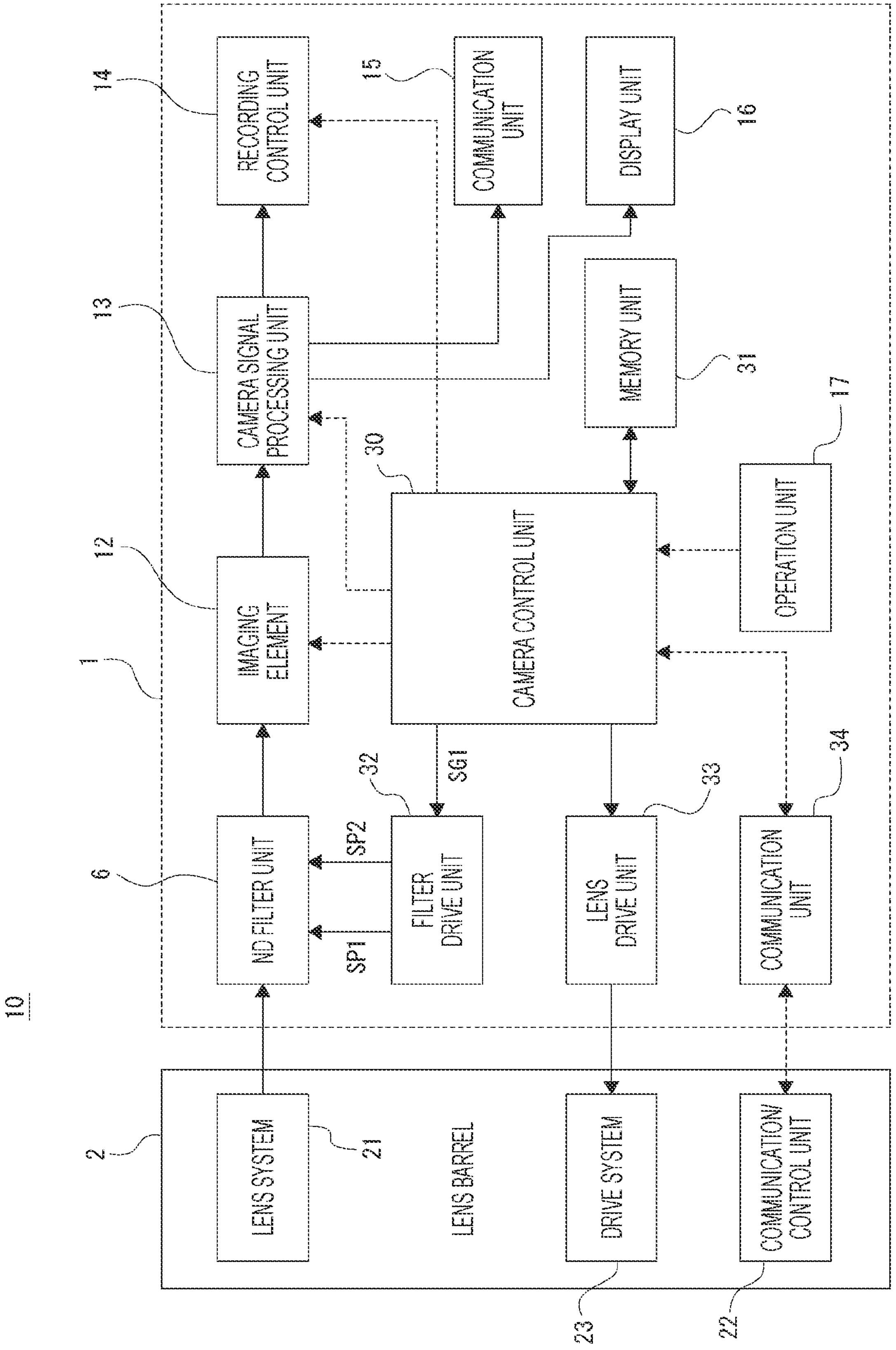
FIG. 4 is a block diagram of the imaging device according to the embodiment.

FIG. 4 illustrates an internal configuration of the main body part 1 of the imaging device 10 according to the embodiment. At the same time, the drawing also illustrates an internal configuration of the lens barrel 2 mounted on main body part 1.

The main body part 1 includes the ND filter unit 6, the imaging element 12, a camera signal processing unit 13, a recording control unit 14, a communication unit 15, a display unit 16, an operation unit 17, a camera control unit 30, a memory unit 31, a filter drive unit 32, a lens drive unit 33, and a communication unit 34.

A lens system 21 in the lens barrel 2 includes lenses such as a zoom lens and a focus lens, and a diaphragm mechanism. Light (incident light) from a subject is guided by this lens system 21 and condensed on the imaging element 12 via the ND filter unit 6.

As described above, the ND filter unit 6 includes the two filter disks 6A and 6B to adjust the amount of incident light. The transmittance variable operation by the ND filter unit 6 will be described later.

The imaging element 12 is configured as, for example, a charge coupled device (CCD) type, a complementary metal oxide semiconductor (CMOS) type, or the like.

The imaging element 12 executes, for example, correlated double sampling (CDS) processing, automatic gain control (AGC) processing, or the like on an electric signal obtained by photoelectric conversion of the received light, and further performs analog/digital (A/D) conversion processing. Then, the imaging signal as digital data is output to the camera signal processing unit 13 in the subsequent stage.

The camera signal processing unit 13 is configured as, for example, an image processor with a digital signal processor (DSP) or the like. This camera signal processing unit 13 performs various types of signal processing on a digital signal (captured image signal), that is, RAW image data, from the imaging element 12.

For example, the camera signal processing unit 13 performs preprocessing, synchronization processing, YC generation processing, resolution conversion processing, codec processing, or the like.

In the preprocessing, clamping processing of clamping black levels of R, G, and B to a predetermined level, correction processing among color channels of R, G, and B, or the like is performed on the captured image signal from the imaging element 12.

In the synchronization processing, processing that allows image data for each pixel to have all color components of R, G, and B, for example, demosaic processing is performed.

In the YC generation processing, a luminance (Y) signal and a color (C) signal are generated (separated) from image data of R, G, and B.

In the resolution conversion processing, the resolution conversion processing is executed on image data subjected to various types of signal processing.

In the codec processing, the resolution-converted image data is subjected to encoding processing, for example, for recording or communication.

Then, the camera signal processing unit 13 outputs the image data subjected to the encoding processing for recording and communication to the recording control unit 14 and the communication unit 15.

Furthermore, the camera signal processing unit 13 can also output RAW image data as a moving image or a still image to the recording control unit 14 or the communication unit 15 as image data for recording or communication.

The recording control unit 14 performs, for example, recording and reproduction on a recording medium configured using a non-volatile memory. The recording control unit 14 performs, for example, processing of recording an image file such as moving image data or still image data on a recording medium.

Actual forms of the recording control unit 14 can be diversely considered. For example, the recording control unit 14 may be configured as a flash memory built in the main body part 1 and a write/read circuit thereof. Furthermore, the recording control unit 14 may be in a form of a card recording/reproducing unit that performs recording/reproducing access to a recording medium detachable from the main body part 1, for example, a memory card (portable flash memory or the like). Furthermore, in some cases, the recording control unit 14 is implemented as a hard disk drive (HDD) or the like in a form built in the main body part 1.

The communication unit 15 performs data communication and network communication with an external device in a wired or wireless manner.

For example, captured image data (a still image file or a moving image file) is transmitted and output to an external display device, recording device, reproduction device, or the like.

Furthermore, assuming that the communication unit 15 is a network communication unit, for example, the communication unit 15 may communicate with various networks such as the Internet, a home network, and a local area network (LAN), and transmit and receive various types of data to and from a server, a terminal, and the like on the network.

The display unit 16 is a display device that performs various types of display for an image capturing person, and is, for example, a monitor display panel disposed in the housing of the main body part 1. Furthermore, a viewfinder provided in the finder unit 3 is also assumed as one aspect of the display unit 16.

The display unit 16 executes various types of display on a display screen on the basis of an instruction from the camera control unit 30.

For example, the display unit 16 displays a reproduced image of image data read from the recording medium in the recording control unit 14.

Furthermore, image data of the captured image whose resolution has been converted for display by the camera signal processing unit 13 is supplied to the display unit 16, and display corresponding to the image data, for example, display of a live view image is performed.

Furthermore, the display unit 16 executes displays of various operation menus, icons, messages, and the like, that is, graphical user interfaces (GUIs) on the screen on the basis of an instruction from the camera control unit 30.

The operation unit 17 collectively indicates input devices configured for the user to perform various operation inputs. Specifically, the operation unit 17 indicates keys, dials, and the like as various operation elements provided in the housing of the main body part 1. Furthermore, the operation element corresponding to the operation unit 17 includes, for example, a touch panel provided on a monitor display panel as the display unit 16 and a touch pad. Furthermore, the operation unit 17 may be configured as a receiving unit of an operation signal from a remote controller.

The operation unit 17 detects an operation by the user, and a signal corresponding to the input operation is transmitted to the camera control unit 30.

In the case of the present embodiment, the operation unit 17 is provided with an operation element for the user to switch the transmittance of the ND filter unit 6.

For example, a transmittance increase/decrease operation element is provided. For the sake of description, increase operation refers to an operation of increasing the transmittance stepwise, and decrease operation refers to an operation of decreasing the transmittance stepwise.

Furthermore, an operation element of direct operation may be provided in addition to the operation element of the increase operation and the decrease operation.

The direct operation is an operation of directly designating a certain transmittance. For example, by providing keys corresponding to "clear (1/1)", "½", "¼", . . . , and the like as the transmittance, the user can directly designate an optional transmittance.

Note that, in the present disclosure, a fractional notation such as "½" indicating the amount of transmitted light is used for the transmittance notation. For example, "½" means that the amount of light is reduced to ½, and means 50% in terms of transmittance. Furthermore, "clear" means total transmission (transmittance of 100%), but does not have to be strictly 100%.

The camera control unit 30 includes a microcomputer (arithmetic processing unit) equipped with a central processing unit (CPU).

The memory unit 31 stores information and the like used for processing by the camera control unit 30. This memory unit 31 comprehensively indicate, for example, a read only memory (ROM), a random access memory (RAM), a flash memory, and the like. The memory unit 31 may be a memory area built in a microcomputer chip serving as the camera control unit 30 or may be configured using a separate memory chip.

The camera control unit 30 controls the entire imaging device 10 by executing a program stored in the ROM, the flash memory, or the like of the memory unit 31.

For example, the camera control unit 30 performs control for control of shutter speed of the imaging element 12, instruction of various types of signal processing in the camera signal processing unit 13, imaging operation and recording operation in response to an operation by the user, reproduction operation of a recorded image file, lens operation such as zoom, focus, and aperture adjustment, operation of the ND filter unit 6, operation of the user interface, and the like.

The RAM in the memory unit 31 is used for temporary storage of data, a program, and the like as a work area during various types of data processing of the CPU.

The ROM and the flash memory (non-volatile memory) in the memory unit 31 are used for storing an operating system (OS) for the CPU to control each unit, content files such as image files, application programs for various operations, firmware, and the like.

The filter drive unit 32 drives the filter disks 6A and 6B of the ND filter unit 6 by drive signals SP1 and SP2 to change the transmittance. The filter drive unit 32 generates the drive signals SP1 and SP2 on the basis of, for example, a drive instruction SG1 from the camera control unit 30, and rotationally drives the filter disks 6A and 6B.

The drive signal SP1 is a drive current signal of a not-illustrated motor that rotationally drives the filter disk 6A, and the drive signal SP2 is a drive current signal of a not-illustrated motor that rotationally drives the filter disk 6B.

The lens drive unit 33 outputs a drive signal of a drive system 23 of the lens barrel 2 on the basis of an instruction from the camera control unit 30.

The drive system 23 of the lens barrel 2 includes, for example, a motor that drives a focus lens and a zoom lens in the lens system 21, a motor that drives a diaphragm mechanism, and the like. The lens drive unit 33 outputs drive signals of these motors to cause the lens barrel 2 to execute a required operation.

The communication unit 34 communicates with the lens barrel 2.

The lens barrel 2 is mounted with, for example, a communication/control unit 22 configured using a microcomputer, and the camera control unit 30 can perform various types of data communication with the communication/control unit 22 via the communication unit 34.

2. Configuration of ND Filter Unit

A configuration of the ND filter unit 6 of the present embodiment, particularly a configuration of the filter disks 6A and 6B is described.

In the present embodiment, the two filter disks 6A and 6B are provided, and various transmittances can be realized by rotating the filter disks 6A and 6B, respectively. However, first, a problem at the time of rotation is described.

As illustrated in FIG. 3, the filter disk 6A includes the three optical ND filters 51A, 52A, and 53A, and the filter disk 6B also includes the three optical ND filters 51B, 52B, and 53B. When the filter disks 6A and 6B are rotated, the shadow of the filter holder is reflected in the imaging element 12.

Figure 5:
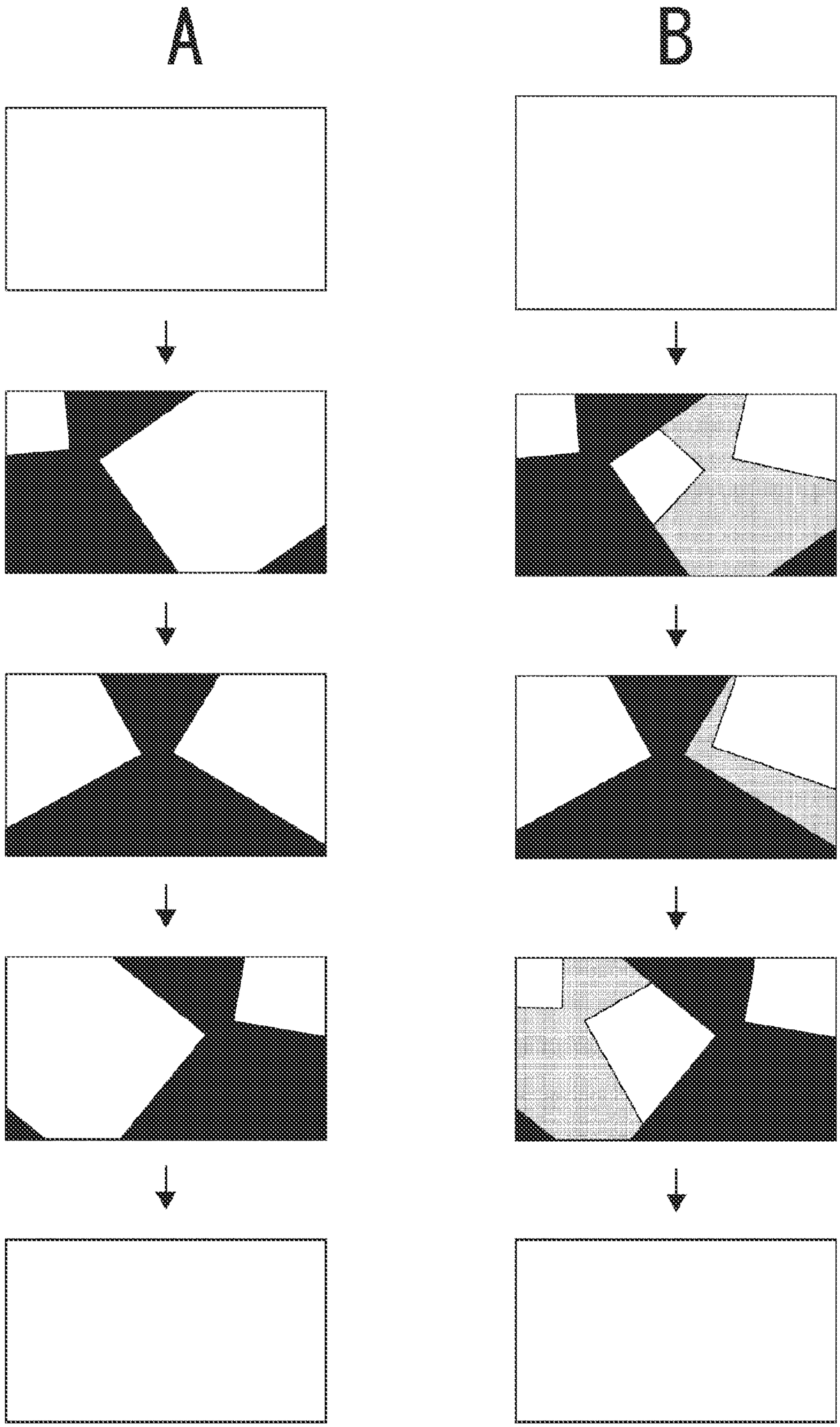
FIG. 5 is an explanatory view of shadows reflected when filter disks rotate.

For example, when the filter disk 6A is rotated by 120 degrees from a state where the optical ND filter 51A is inserted into the incident optical path to a state where the optical ND filter 52A is inserted therein, a shadow of a portion of the filter holder between the optical ND filters 51A and 52A appears. Therefore, in a state where the live view is displayed on the display unit 16, the user visually recognizes an image in which the shadow runs as illustrated in FIG. 5A for a moment when the filter disk 6A rotates.

The user recognizes this shadow as being due to the switching operation of the ND filter. Therefore, usually, the user feels natural that the shadow as shown in FIG. 5A is visually recognized for a moment in response to the operation of changing the transmittance by one level.

However, in a case where the two filter disks 6A and 6B are rotated, the filter disks 6A and 6B rotate in opposite directions, or even in the same direction, the rotation amounts are different, or the filter disks 6A and 6B rotate at different timings, which causes the state of the visually recognized shadows becomes irregular. For example, as illustrated in FIG. 5B, an image in which two shadows run alternately is visually recognized. The user feels discomfort when viewing an image in which a plurality of shadows runs even when the user has instructed the transmittance change only by one level by, for example, the increase operation or the decrease operation. In some cases, it may be erroneously recognized that an operation error has occurred.

Here, if the user individually performs the increase/decrease operation on each of the two filter disks 6A and 6B, such discomfort does not occur. For example, if the user performs the increase/decrease operation for the filter disk 6A to switch the transmittance of the filter disk 6A, the shadow of the rotation of filter disk 6A is visually recognized. Furthermore, if the user performs the increase/decrease operation for the filter disk 6B to switch the transmittance of the filter disk 6B, the shadow of the rotation of filter disk 6B is visually recognized. This causes matching between the operation and the state of the shadow to be visually recognized, and thus, the user does not feel discomfort.

However, individually operating the filter disks 6A and 6B as described above is a complicated operation, and deteriorates operability in an actual imaging scene.

Therefore, in the present embodiment, operability is improved by making it appear as if one filter disk is rotating by a simple increase/decrease operation in a state of having the two filter disks 6A and 6B, without causing discomfort due to mismatching between the operation and the shadow.

Figure 6:
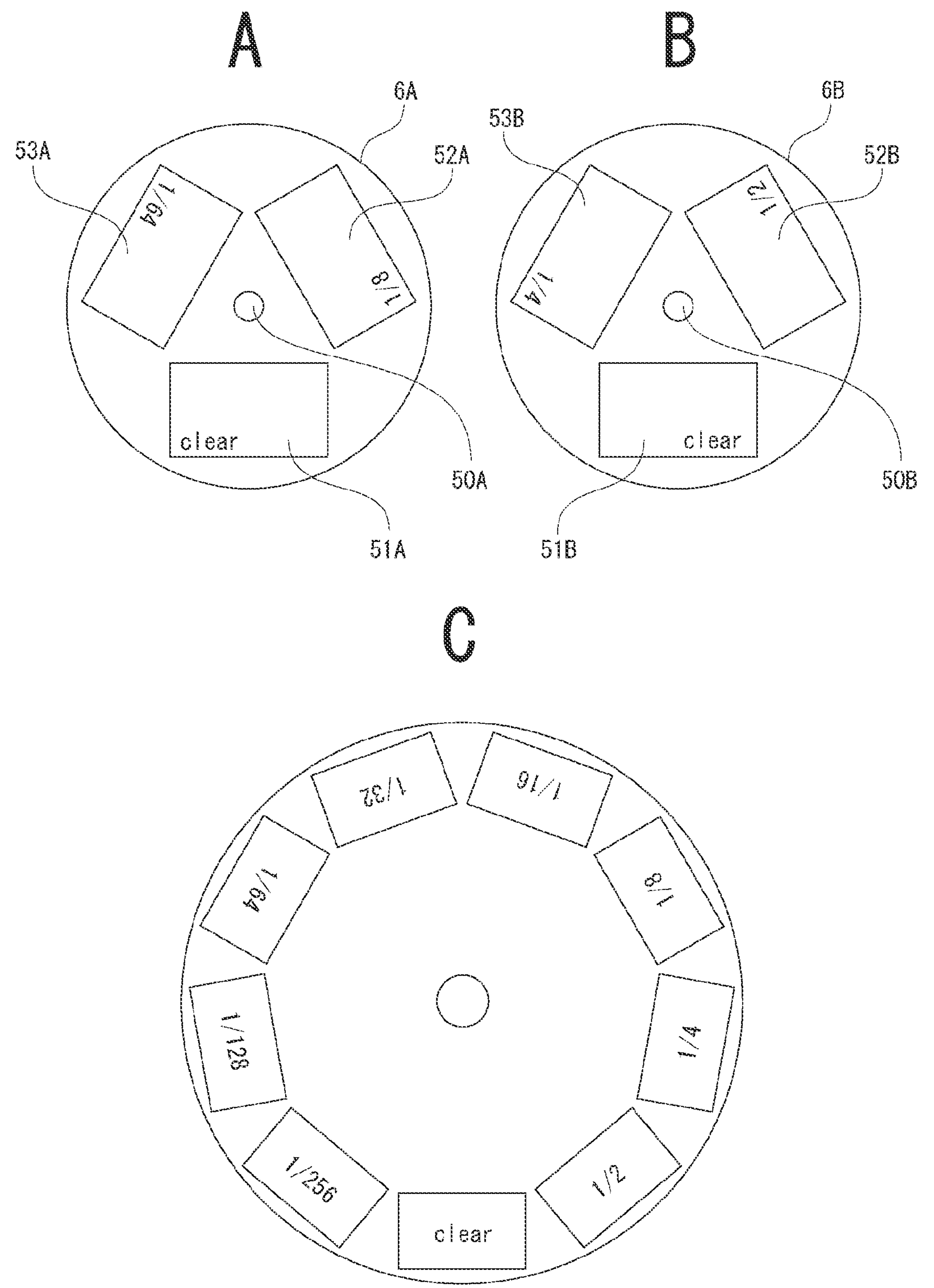
FIG. 6 is an explanatory view of a configuration of the filter disk according to the embodiment.

FIG. 6A illustrates the optical ND filters 51A, 52A, and 53A of the filter disk 6A, and FIG. 6B illustrates the optical ND filters 51B, 52B, and 53B of the filter disk 6B.

In the filter disk 6A, the optical ND filter 51A is a clear filter, that is, a filter having a transmittance of 100%. The optical ND filter 52A is a filter having a transmittance of ⅛. The optical ND filter 53A is a filter having a transmittance of 1/64.

Furthermore, in the filter disk 6B, the optical ND filter 51B is a clear filter, the optical ND filter 52B is a filter having a transmittance of ½, and the optical ND filter 53B is a filter having a transmittance of ¼.

In addition, in the filter disk 6A, the three optical ND filters 51A, 52A, and 53A having a larger change width between transmittances of "clear", "⅛", and "1/64" than the change width between the transmittances of the filter disk 6B, are aligned in the order of transmittance in the circumferential direction.

In this case, the filters are aligned in the order of decreasing transmittance in the counterclockwise direction in the drawing with an angle of 120 degrees.

Furthermore, in the filter disk 6B, the three optical ND filters 51B, 52B, and 53B having a smaller change width between transmittances of "clear", "½", and "¼" than the change width between the transmittances of the filter disk 6A, are aligned in the order of transmittance in the circumferential direction. In this case, the filters are aligned in the order of decreasing transmittance in the counterclockwise direction in the drawing with an angle of 120 degrees.

Further, each of the optical ND filters 51B, 52B, and 53B of the filter disk 6B is obtained by further dividing the change width between the transmittances by one level of the optical ND filters 51A, 52A, and 53A in the filter disk 6A into a plurality of levels.

That is, in the filter disk 6A, three optical ND filters in which the change width between the transmittances by one level is coarse are disposed at equal intervals in the order of transmittance in the circumferential direction, and in the filter disk 6B, three optical ND filters in which the change width between the transmittances by one level is dense are disposed at equal intervals in the order of transmittance in the circumferential direction.

By using such two filter disks 6A and 6B, the transmittance can be switched into nine levels of "clear", "½", "¼", "⅛", "1/16", "1/32", "1/64", "1/128", and "1/256" by selecting the optical ND filters to be inserted into the incident optical path.

FIG. 7 illustrates the nine levels of transmittance as the total transmittance of the ND filter unit 6, and illustrates the transmittance of the optical ND filter selected by the filter disks 6A and 6B for the nine levels of transmittance.

Transmittances of "clear" and "clear" generate the total transmittance of "clear".

Transmittances of "clear" and "½" generate the total transmittance of "½".

Transmittances of "clear" and "¼" generate the total transmittance of "¼".

Transmittances of "⅛" and "clear" generate the total transmittance of "⅛".

Transmittances of "⅛" and "½" generate the total transmittance of "1/16".

Transmittances of "⅛" and "¼" generate the total transmittance of "1/32".

Transmittances of "1/64" and "clear" generate the total transmittance of "1/64".

Transmittances of "1/64" and "½" generate the total transmittance of "1/128".

Transmittances of "1/64" and "¼" generate the total transmittance of "1/256".

In the present embodiment, at the time of switching the nine levels of transmittance, the user performs switching control to recall the image of the filter disk as illustrated in FIG. 6C.

That is, an operational feeling as if the filter disk rotates in the order of "clear", "½", "¼", "⅛", "1/16", "1/32", "1/64", "1/128", "1/256", and "clear" is generated as the ND filter unit 6 for each decrease operation.

That is, an operational feeling as if the filter disk rotates in the order of "clear", "1/256", "1/128", "1/64", "1/32", "1/16", "⅛", "¼", "½", and "clear" is generated as the ND filter unit 6 for each decrease operation.

At the time of such decrease operation and increase operation, by generating a state that appears as if one filter disk is rotating even for the shadow reflected, the discomfort at the time of the decrease operation and the increase operation is eliminated.

Note that the rotation position states of the filter disks 6A and 6B in the case of obtaining each transmittance are illustrated in FIGS. 8 to 16. In each drawing, it is assumed that an optical ND filter located in the lower part of a circle indicating each of the filter disks 6A and 6B is inserted into the incident optical path.

Furthermore, a circle on the right side indicating the ND filter unit 6 indicates a state in which the filter disks 6A and 6B overlap with each other.

Figure 8:
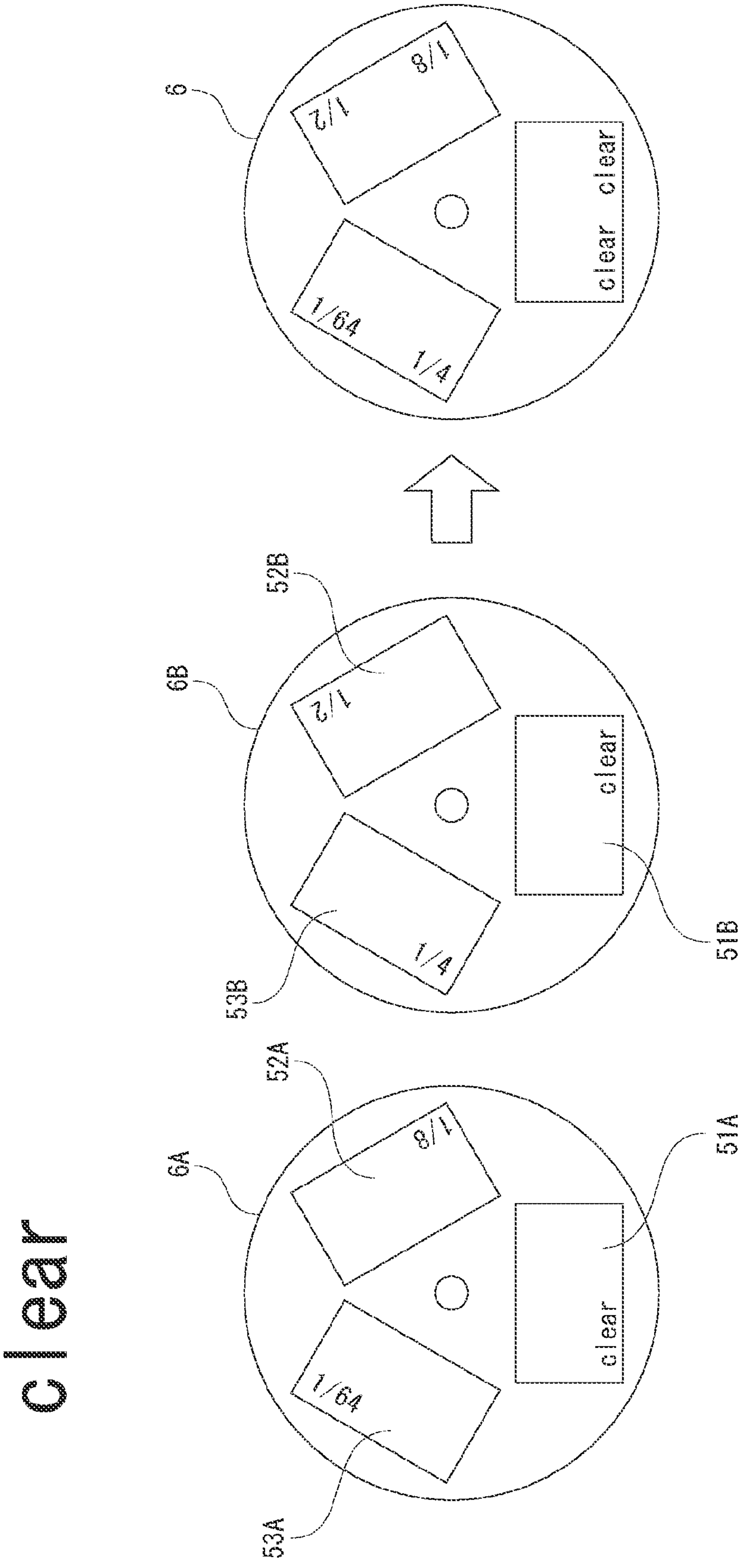
FIG. 8 is an explanatory view of the ND filter unit according to the embodiment in a state of clear.

FIG. 8 illustrates a state of the transmittance of "clear".

The filter disk 6A is set at an angular position at which the "clear" optical ND filter 51A is inserted into the incident optical path, and the filter disk 6B is set at an angular position at which the "clear" optical ND filter 51B is inserted into the incident optical path.

Figure 9:
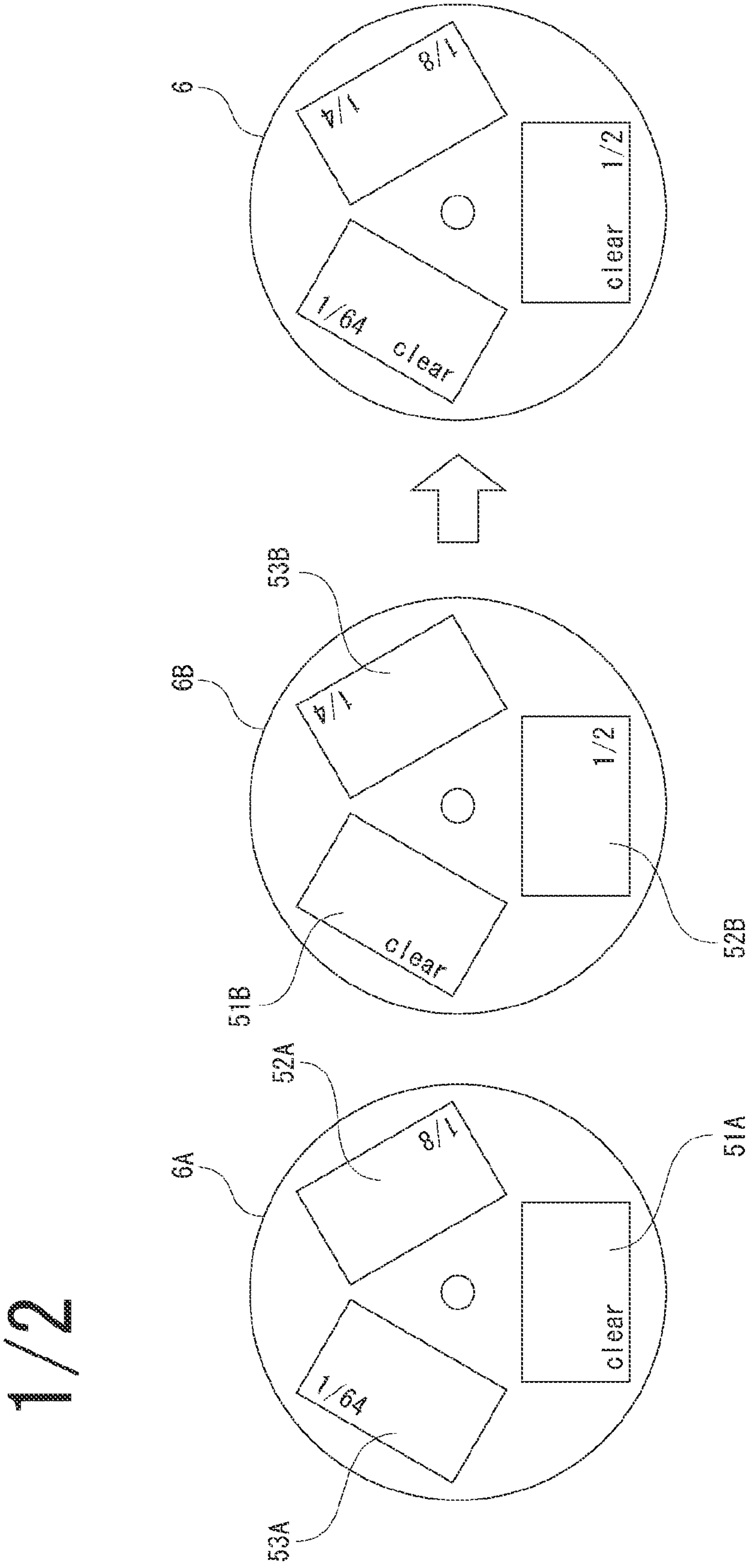
FIG. 9 is an explanatory view of the ND filter unit according to the embodiment in a state of ½ transmittance.

FIG. 9 illustrates a state of the transmittance of "½".

The filter disk 6A is set at an angular position at which the "clear" optical ND filter 51A is inserted into the incident optical path, and the filter disk 6B is set at an angular position at which the "½" optical ND filter 52B is inserted into the incident optical path.

Figure 10:
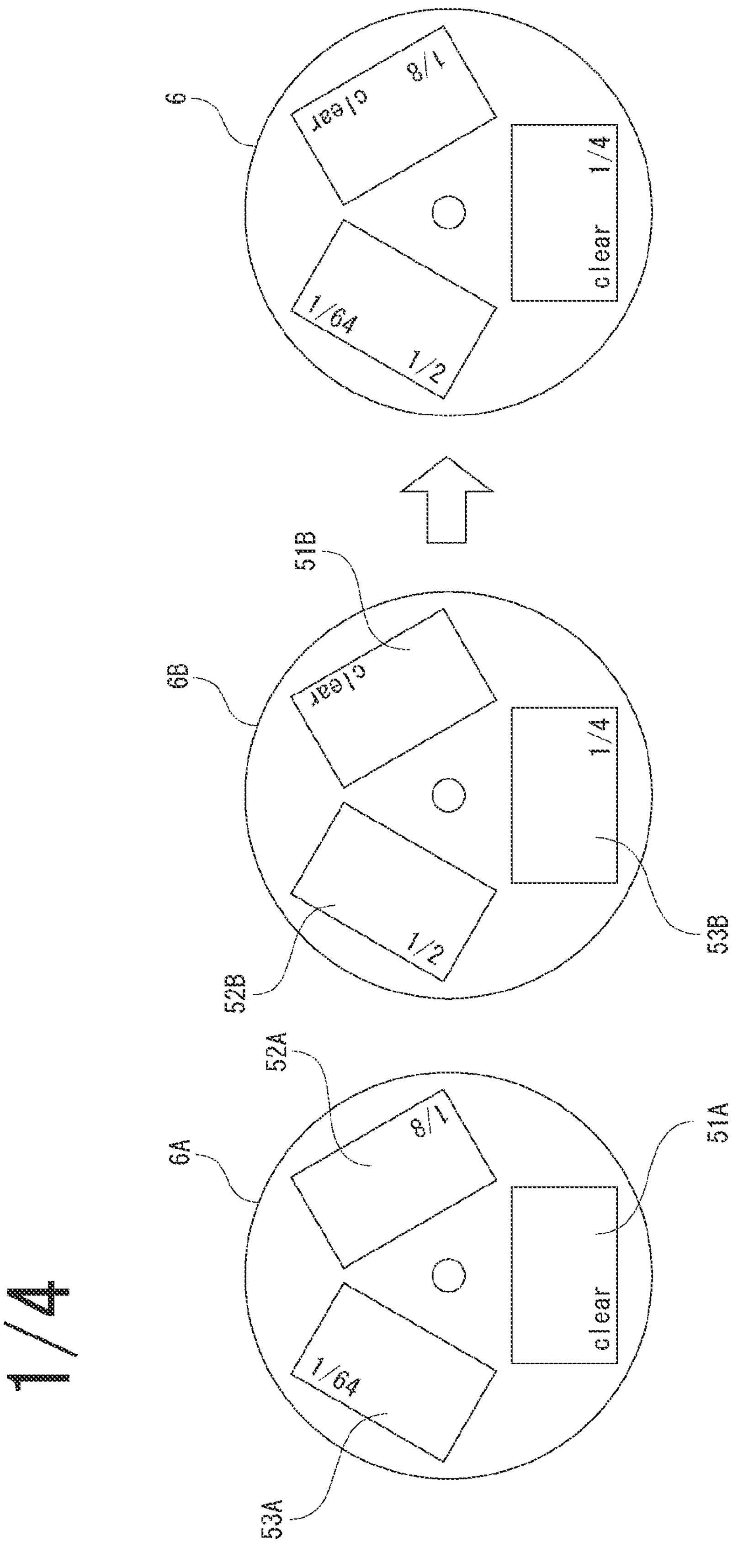
FIG. 10 is an explanatory view of the ND filter unit in a state of ¼ transmittance according to the embodiment.

FIG. 10 illustrates a state of the transmittance of "¼".

The filter disk 6A is set at an angular position at which the "clear" optical ND filter 51A is inserted into the incident optical path, and the filter disk 6B is set at an angular position at which the "¼" optical ND filter 53B is inserted into the incident optical path.

Figure 11:
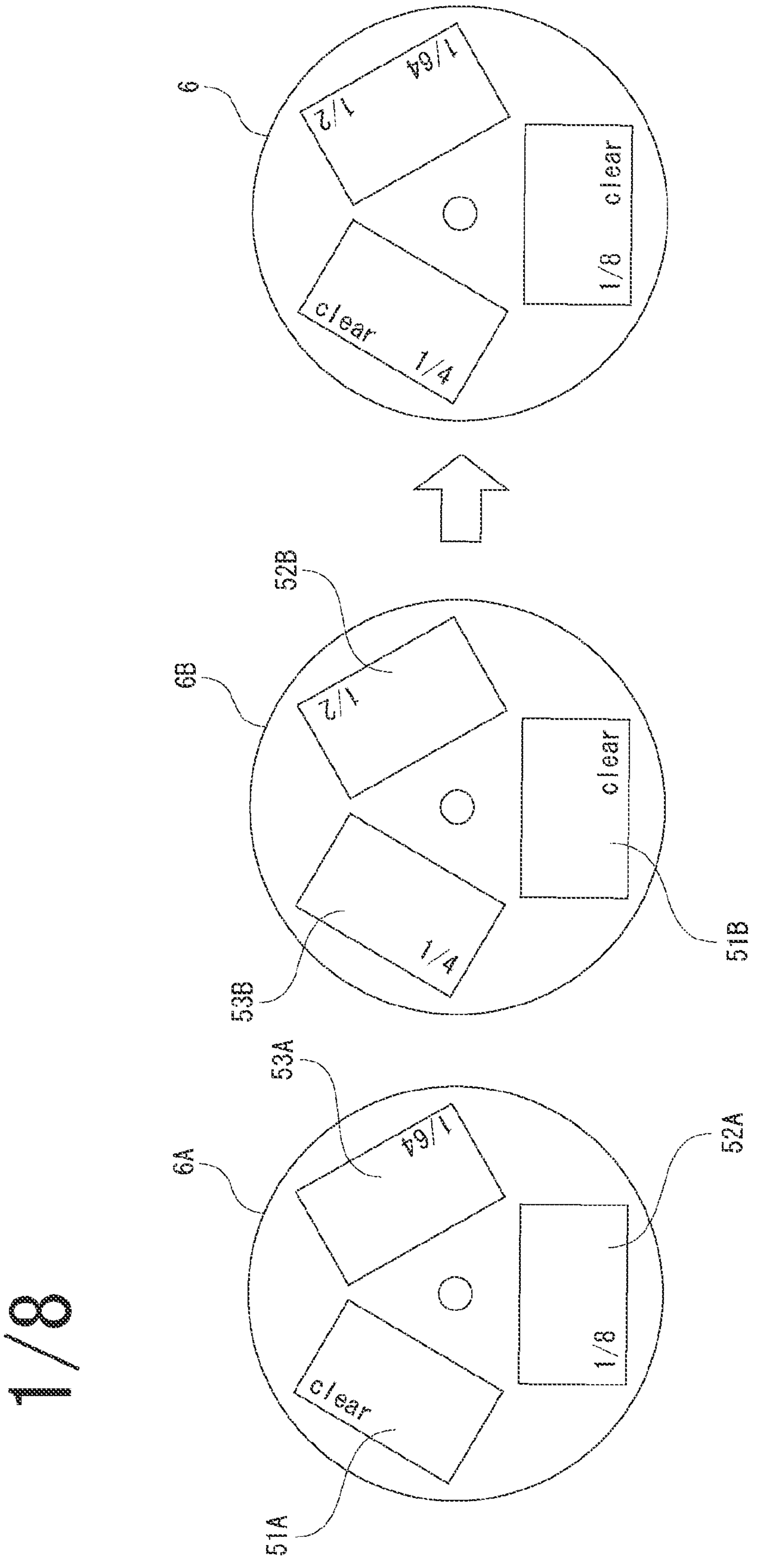
FIG. 11 is an explanatory view of the ND filter unit according to the embodiment in a state of ⅛ transmittance.

FIG. 11 illustrates a state of the transmittance of "⅛".

The filter disk 6A is set at an angular position at which the "⅛" optical ND filter 52A is inserted into the incident optical path, and the filter disk 6B is set at an angular position at which the "clear" optical ND filter 51B is inserted into the incident optical path.

Figure 12:
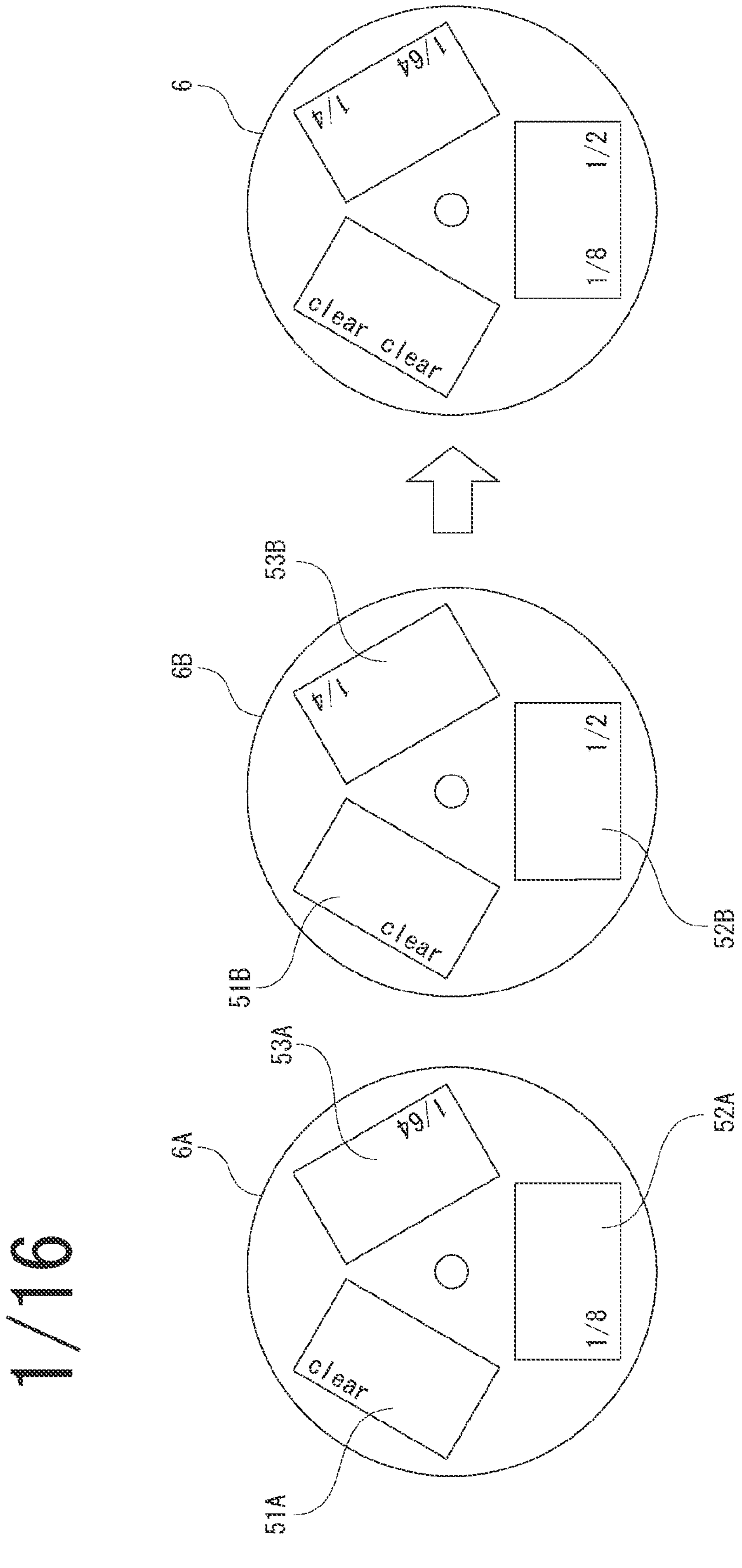
FIG. 12 is an explanatory view of the ND filter unit according to the embodiment in a state of 1/16 transmittance.

FIG. 12 illustrates a state of the transmittance of "1/16".

The filter disk 6A is set at an angular position at which the "⅛" optical ND filter 52A is inserted into the incident optical path, and the filter disk 6B is set at an angular position at which the "½" optical ND filter 52B is inserted into the incident optical path.

Figure 13:
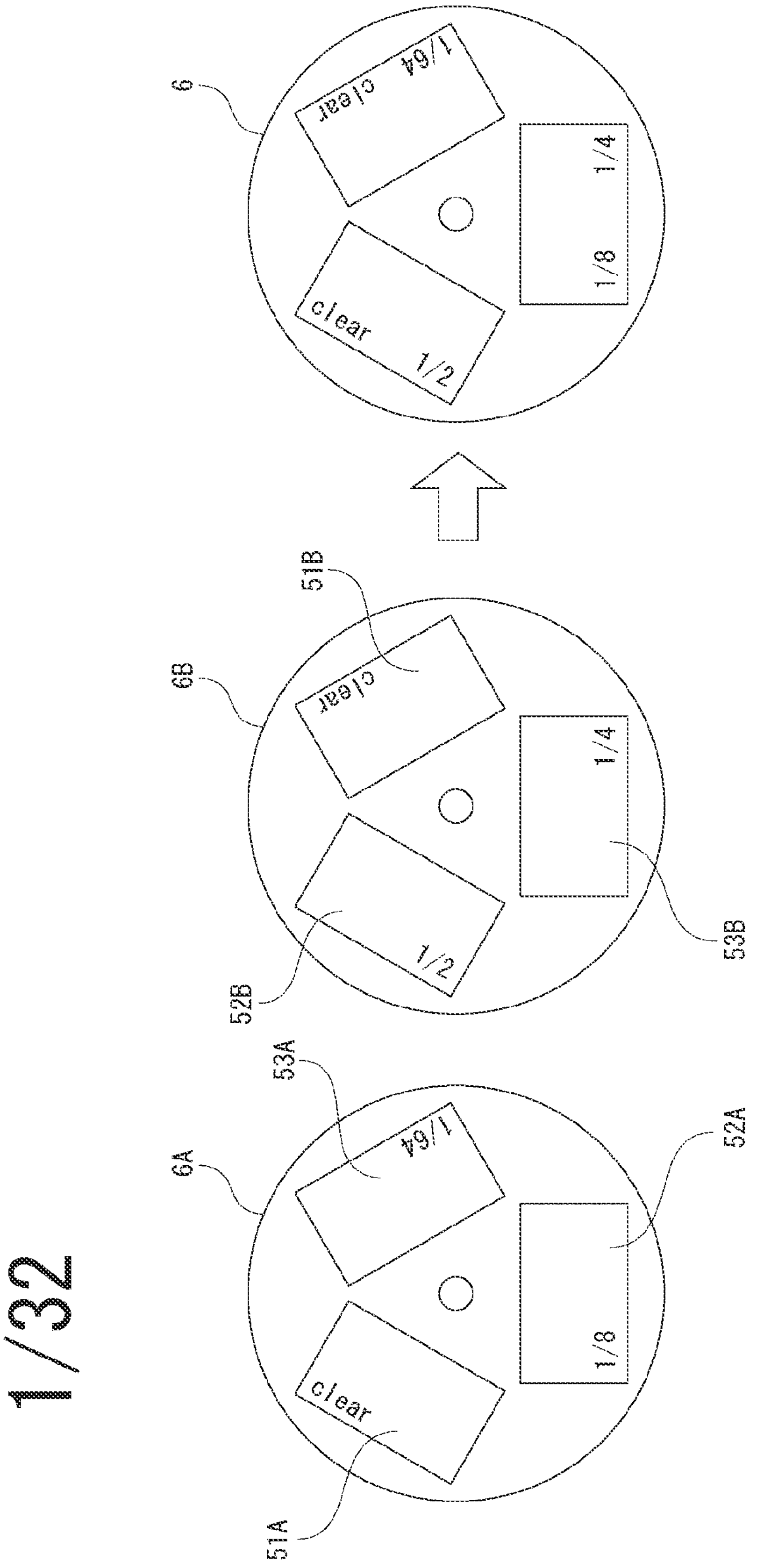
FIG. 13 is an explanatory view of the ND filter unit according to the embodiment in a state of 1/32 transmittance.

FIG. 13 illustrates a state of the transmittance of "1/32".

The filter disk 6A is set at an angular position at which the "⅛" optical ND filter 52A is inserted into the incident optical path, and the filter disk 6B is set at an angular position at which the "¼" optical ND filter 53B is inserted into the incident optical path.

Figure 14:
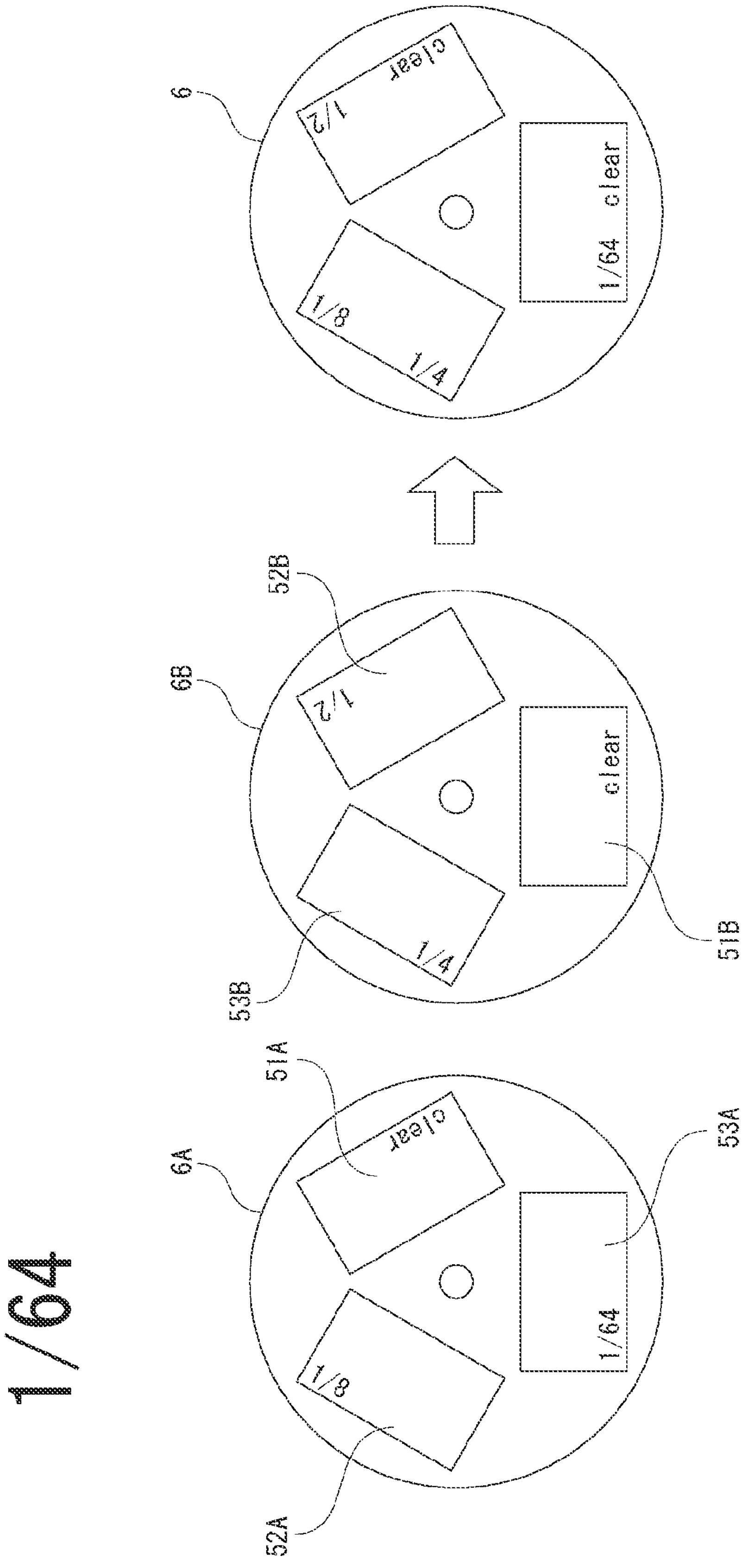
FIG. 14 is an explanatory view of the ND filter unit according to the embodiment in a state of 1/64 transmittance.

FIG. 14 illustrates a state of the transmittance of "1/64".

The filter disk 6A is set at an angular position at which the "1/64" optical ND filter 53A is inserted into the incident optical path, and the filter disk 6B is set at an angular position at which the "clear" optical ND filter 51B is inserted into the incident optical path.

Figure 15:
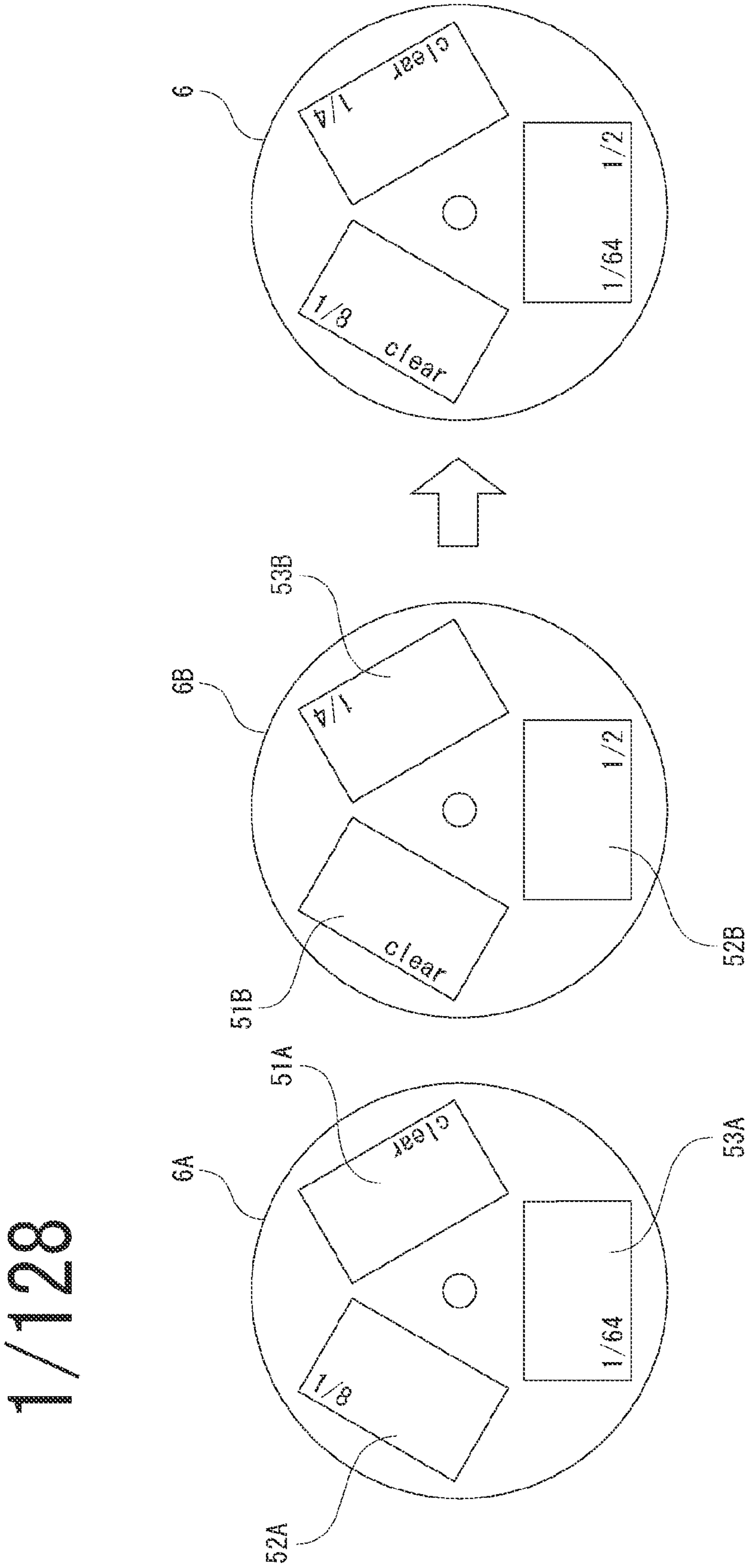
FIG. 15 is an explanatory view of the ND filter unit according to the embodiment in a state of 1/128 transmittance.

FIG. 15 illustrates a state of the transmittance of "1/128".

The filter disk 6A is set at an angular position at which the "1/64" optical ND filter 53A is inserted into the incident optical path, and the filter disk 6B is set at an angular position at which the "½" optical ND filter 52B is inserted into the incident optical path.

Figure 16:
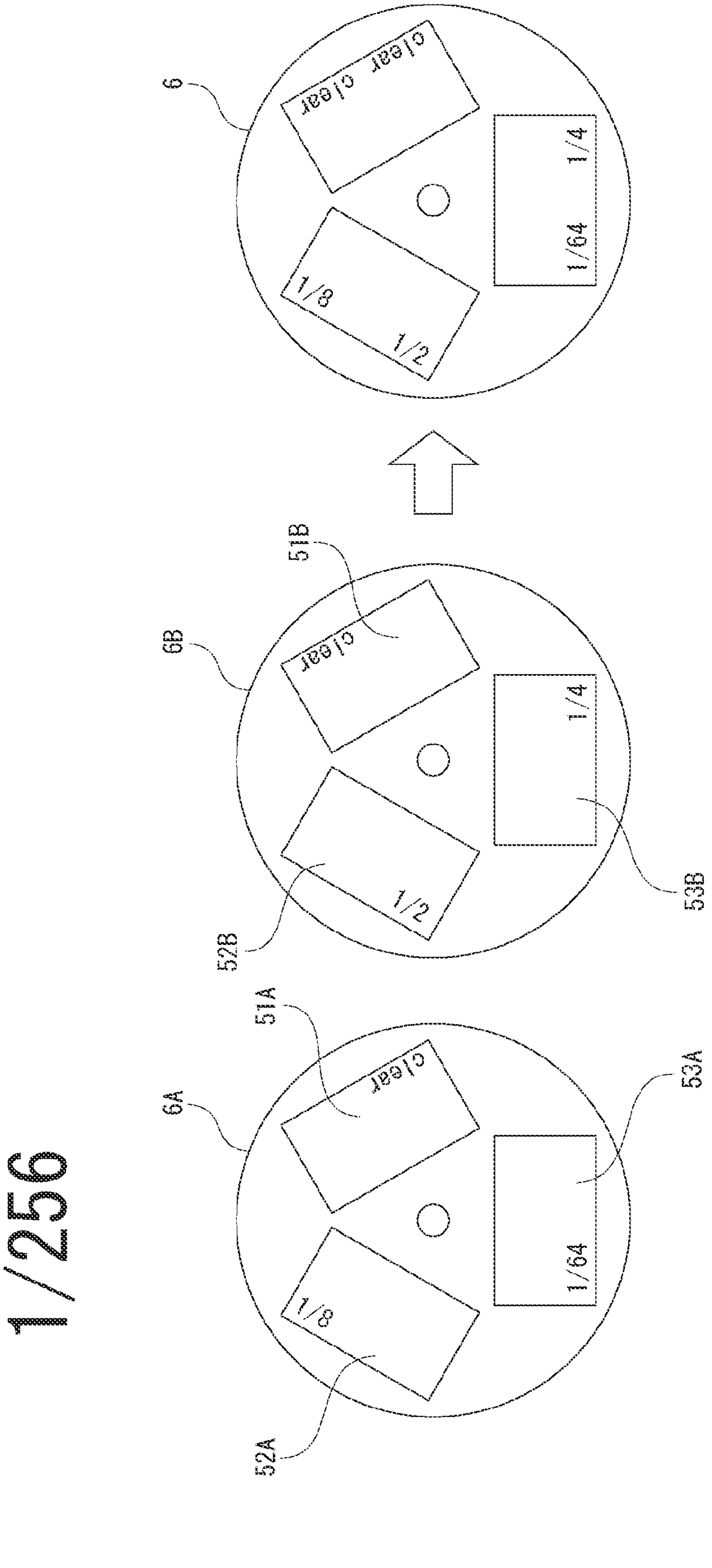
FIG. 16 is an explanatory view of the ND filter unit according to the embodiment in a state of 1/256 transmittance.

FIG. 16 illustrates a state of the transmittance of "1/256".

The filter disk 6A is set at an angular position at which the "1/64" optical ND filter 53A is inserted into the incident optical path, and the filter disk 6B is set at an angular position at which the "1/4" optical ND filter 53B is inserted into the incident optical path.

3. Rotation Operation of Filter Disk

Hereinafter, the rotation operation of the filter disks 6A and 6B in response to the decrease operation by the user is specifically described with reference to FIGS. 17 to 25.

In each drawing, the upper stage shows the rotation position state of the filter disks 6A and 6B before rotation, and the lower stage shows the rotation position state of the filter disks 6A and 6B after rotation. In each drawing, it is assumed that an optical ND filter located in the lower part of a circle indicating each of the filter disks 6A and 6B is inserted into the incident optical path.

Figure 17:
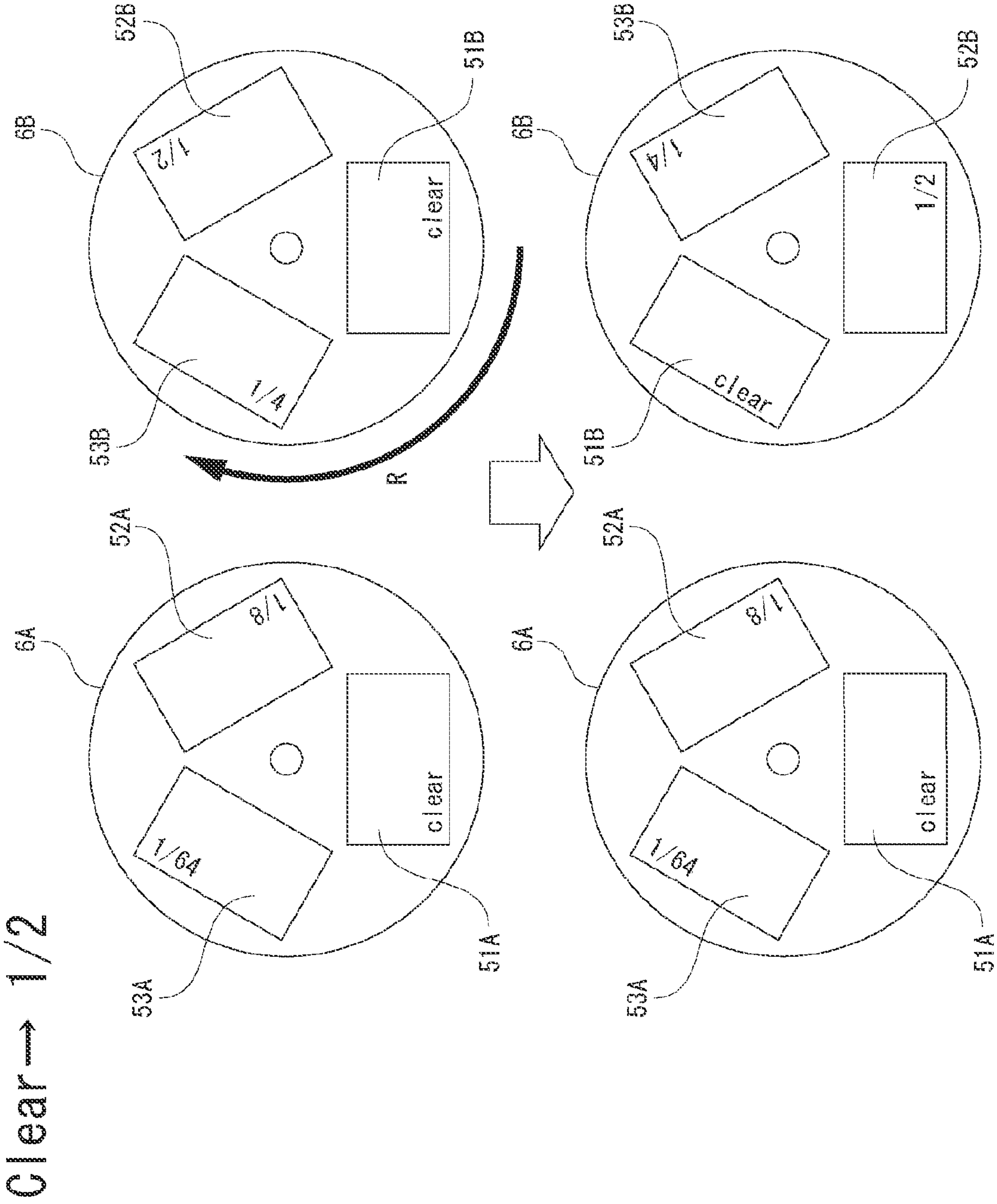
FIG. 17 is an explanatory view of the ND filter unit according to the embodiment in which the transmittance is switched from clear to ½.

FIG. 17 illustrates a case where the transmittance is decreased by one level from "clear" to "1/2".

Before the rotation, the "clear" optical ND filter 51A of the filter disk 6A and the "clear" optical ND filter 51B of the filter disk 6B are respectively inserted into the incident optical path.

From this state, only the filter disk 6B is rotated by 120 degrees in the direction of an arrow R (clockwise direction in the drawing) in response to the decrease operation.

After this rotation, a state is established in which the "clear" optical ND filter 51A of the filter disk 6A and the "1/2" optical ND filter 52B of the filter disk 6B are respectively inserted into the incident optical path, and the transmittance of the ND filter unit 6 becomes "1/2".

Figure 18:
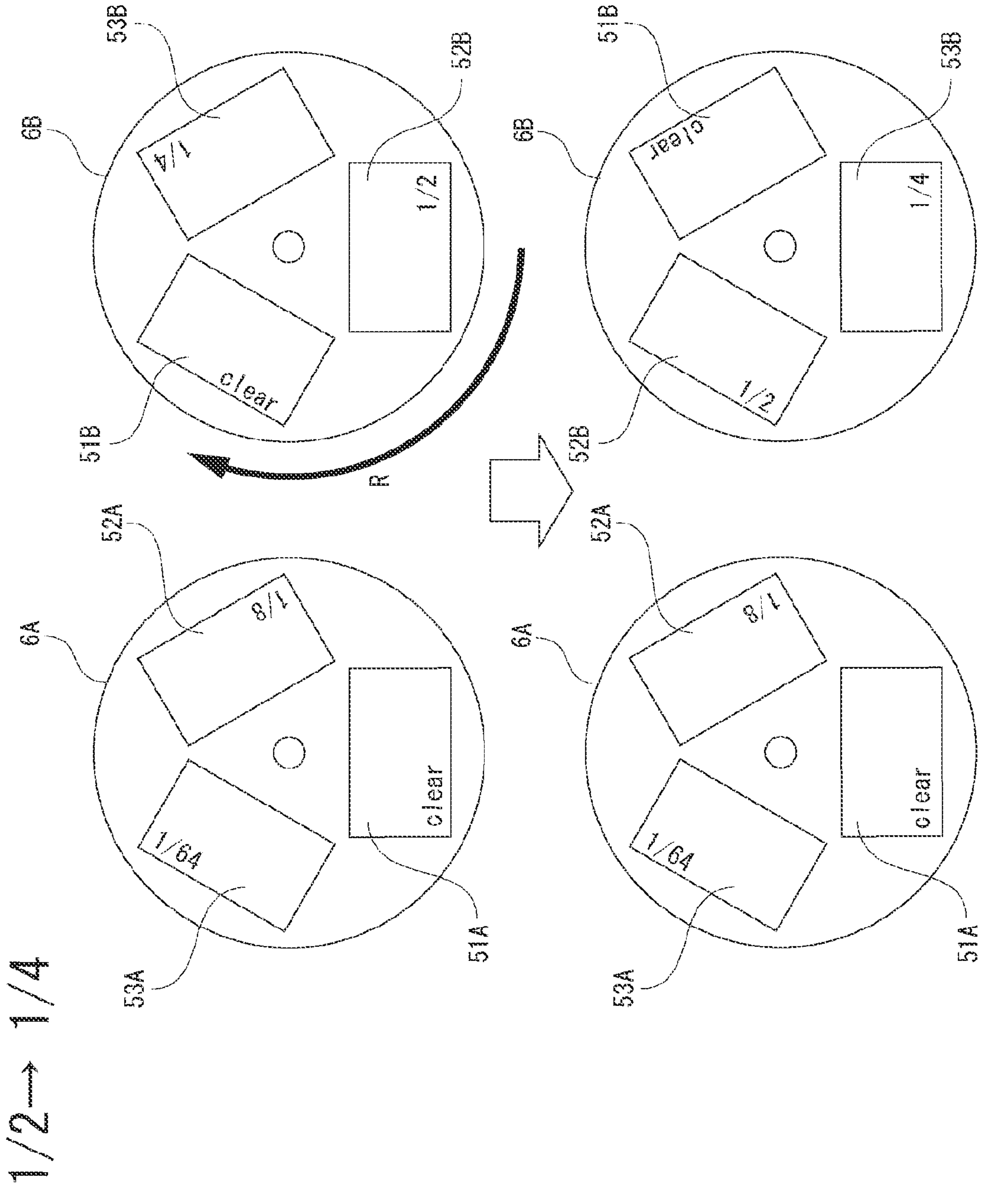
FIG. 18 is an explanatory view of the ND filter unit according to the embodiment in which the transmittance is switched from ½ to ¼.

FIG. 18 illustrates a case where the transmittance is decreased by one level from "1/2" to "1/4".

Before the rotation, the "clear" optical ND filter 51A of the filter disk 6A and the "1/2" optical ND filter 52B of the filter disk 6B are respectively inserted into the incident optical path.

From this state, only the filter disk 6B is rotated by 120 degrees in the direction of the arrow R in response to the decrease operation.

After this rotation, a state is established in which the "clear" optical ND filter 51A of the filter disk 6A and the "1/4" optical ND filter 53B of the filter disk 6B are respectively inserted into the incident optical path, and the transmittance of the ND filter unit 6 becomes "1/4".

Figure 19:
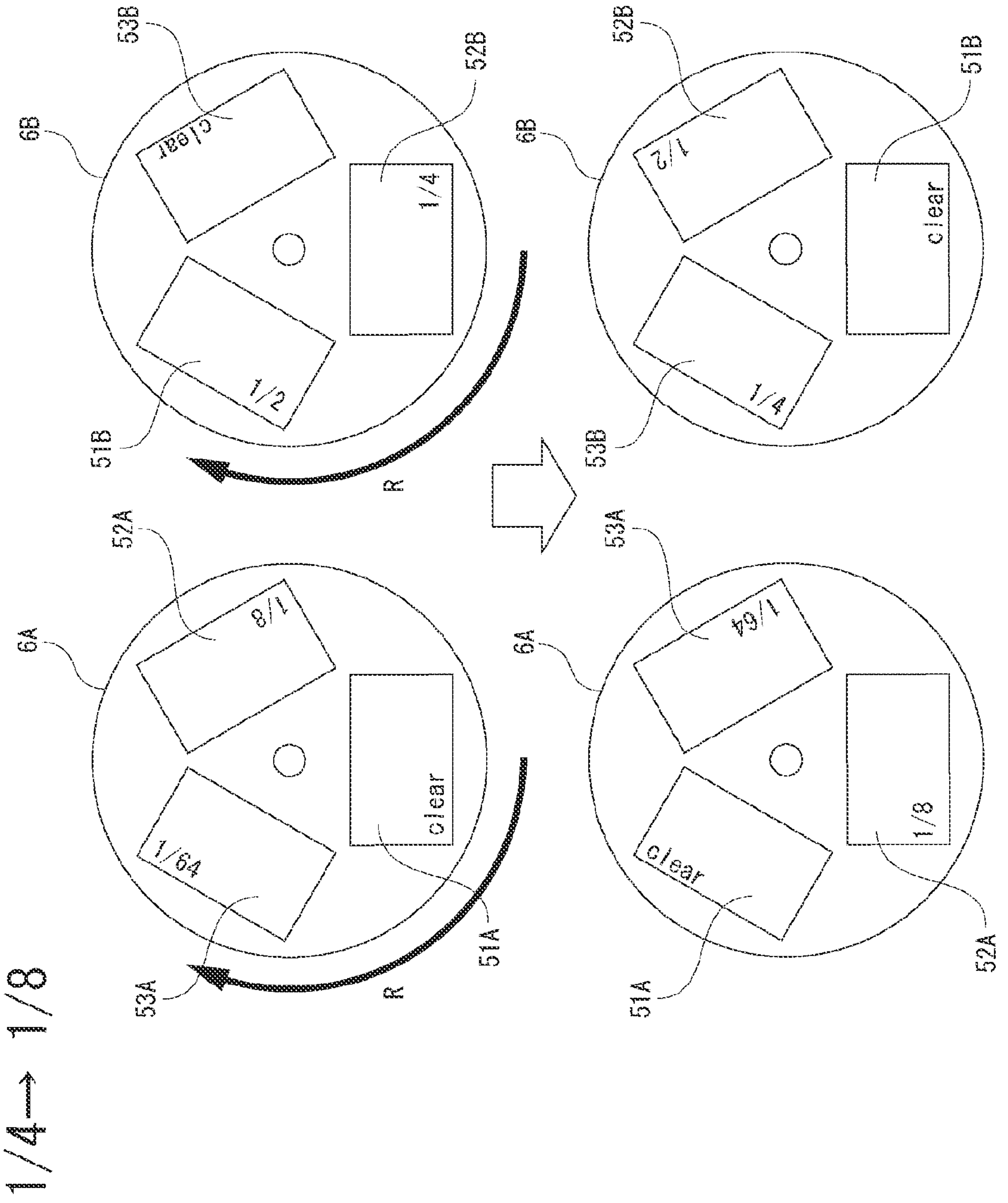
FIG. 19 is an explanatory view of the ND filter unit according to the embodiment in which the transmittance is switched from ¼ to ⅛.

FIG. 19 illustrates a case where the transmittance is decreased by one level from "1/4" to "1/8".

Before the rotation, the "clear" optical ND filter 51A of the filter disk 6A and the "1/4" optical ND filter 53B of the filter disk 6B are respectively inserted into the incident optical path.

From this state, both the filter disks 6A and 6B are rotated by 120 degrees in the direction of the arrow R in response to the decrease operation. In this case, the filter disks 6A and 6B are simultaneously rotated in the same direction by the same displacement amount (that is, both rotated by the rotation amount of 120 degrees).

By rotating the filter disks 6A and 6B simultaneously in the same direction by the same displacement amount in such a manner, the shadows caused by the rotation of the filter disks 6A and 6B and appearing on the monitor display overlap with each other and appear as one. That is, in response to the decrease operation by one level, a visual recognition state is generated on the monitor screen in which only one shadow crosses, and the user does not feel discomfort.

Note that because the description is made on the assumption that the rotation speeds of the filter disks 6A and 6B at the time of being rotationally driven are the same (substantially the same including errors), the shadows appear to overlap with each other by simultaneously rotating the filter disks 6A and 6B. Even if the rotation speeds of the filter disks 6A and 6B are slightly different from each other, by simultaneously rotating the filter disks 6A and 6B, the shadows appear to be only one shadow by substantially overlapping with each other (the width of the shade only appears to be long), and there is no discomfort. However, in a case where the rotation speeds of the filter disks possibly differ from each other by a large amount due to the variable rotation speed or the like, that is, in a case where the shadow appears to be divided into two parts, the filter disks is only required to be rotated with the same rotation speed.

After the simultaneous rotation in the same direction by the same displacement amount (or further, at the substantially same speed) as described above, a state is established in which the "1/8" optical ND filter 52A of the filter disk 6A and the "clear" optical ND filter 51B of the filter disk 6B are respectively inserted into the incident optical path, and the transmittance of the ND filter unit 6 becomes "1/8".

Figure 20:
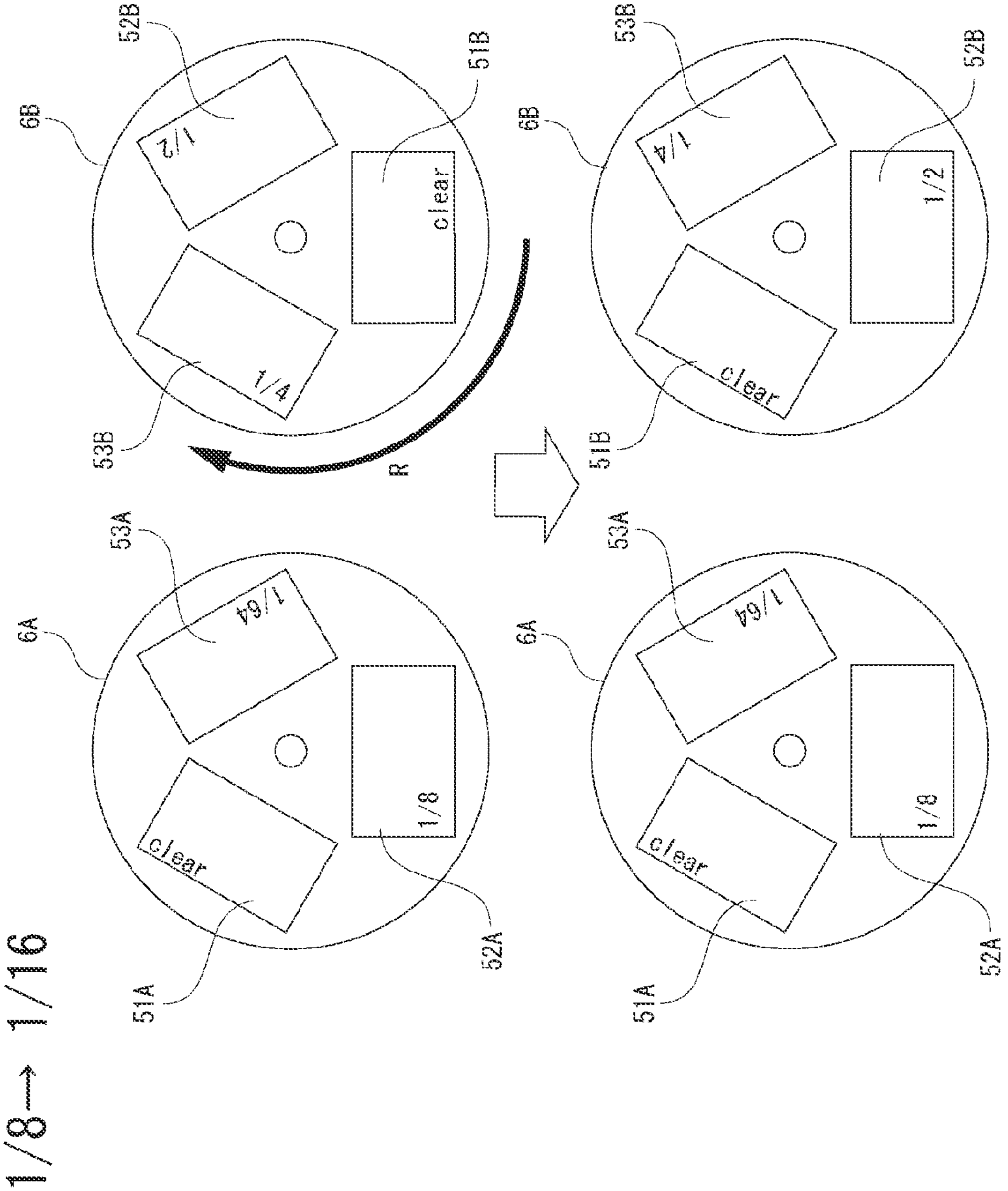
FIG. 20 is an explanatory view of the ND filter unit according to the embodiment in which the transmittance is switched from ⅛ to 1/16.

FIG. 20 illustrates a case where the transmittance is decreased by one level from "1/8" to "1/16".

Before the rotation, the "1/8" optical ND filter 52A of the filter disk 6A and the "clear" optical ND filter 51B of the filter disk 6B are respectively inserted into the incident optical path.

From this state, only the filter disk 6B is rotated by 120 degrees in the direction of the arrow R in response to the decrease operation.

After this rotation, a state is established in which the "1/8" optical ND filter 52A of the filter disk 6A and the "1/2" optical ND filter 52B of the filter disk 6B are respectively inserted into the incident optical path, and the transmittance of the ND filter unit 6 becomes "1/16".

Figure 21:
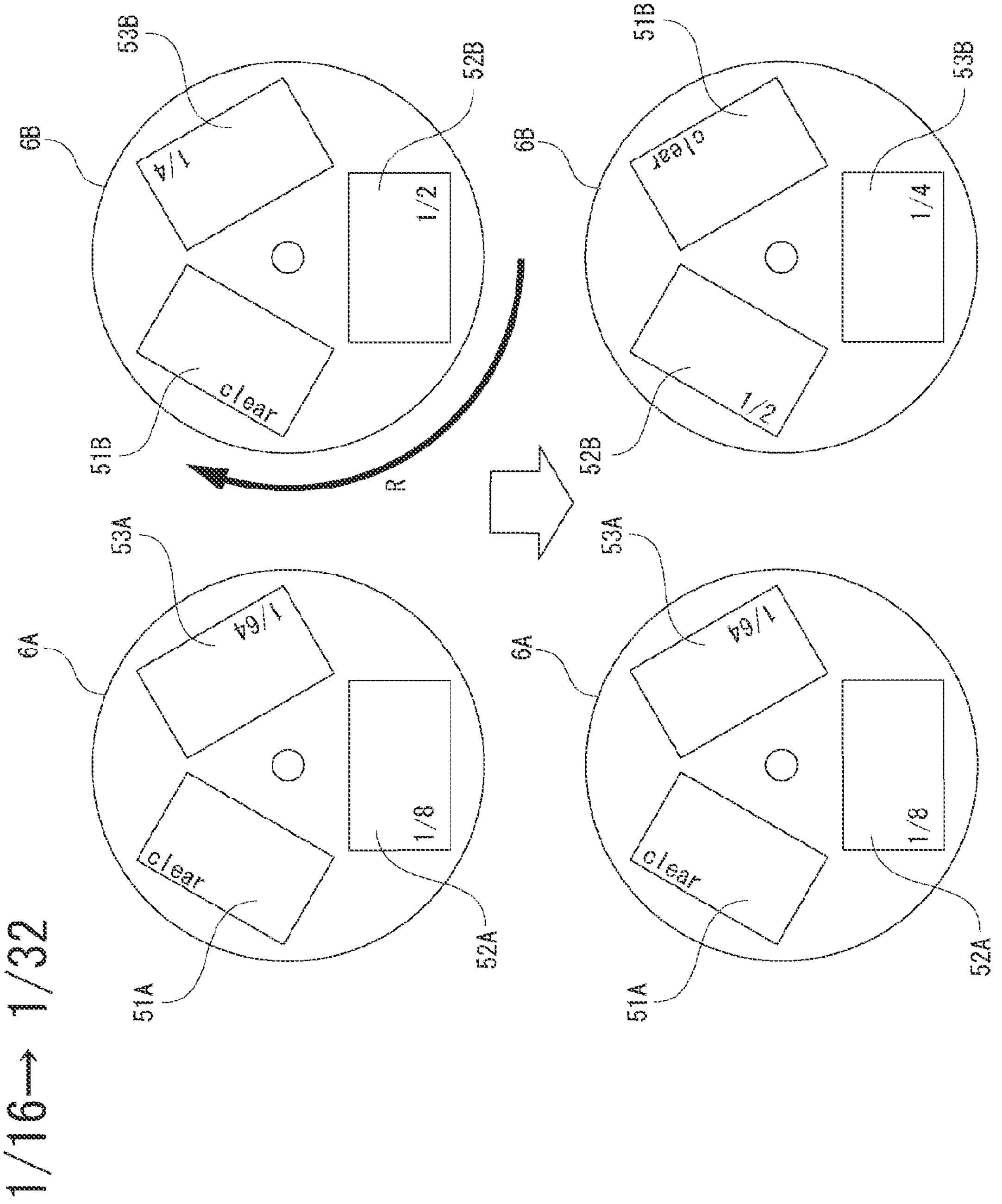
FIG. 21 is an explanatory view of the ND filter unit according to the embodiment in which the transmittance is switched from 1/16 to 1/32.

FIG. 21 illustrates a case where the transmittance is decreased by one level from "1/16" to "1/32". Before the rotation, the "1/8" optical ND filter 52A of the filter disk 6A and the "1/2" optical ND filter 52B of the filter disk 6B are respectively inserted into the incident optical path.

From this state, only the filter disk 6B is rotated by 120 degrees in the direction of the arrow R in response to the decrease operation.

After this rotation, a state is established in which the "1/8" optical ND filter 52A of the filter disk 6A and the "1/4" optical ND filter 53B of the filter disk 6B are respectively inserted into the incident optical path, and the transmittance of the ND filter unit 6 becomes "1/32".

Figure 22:
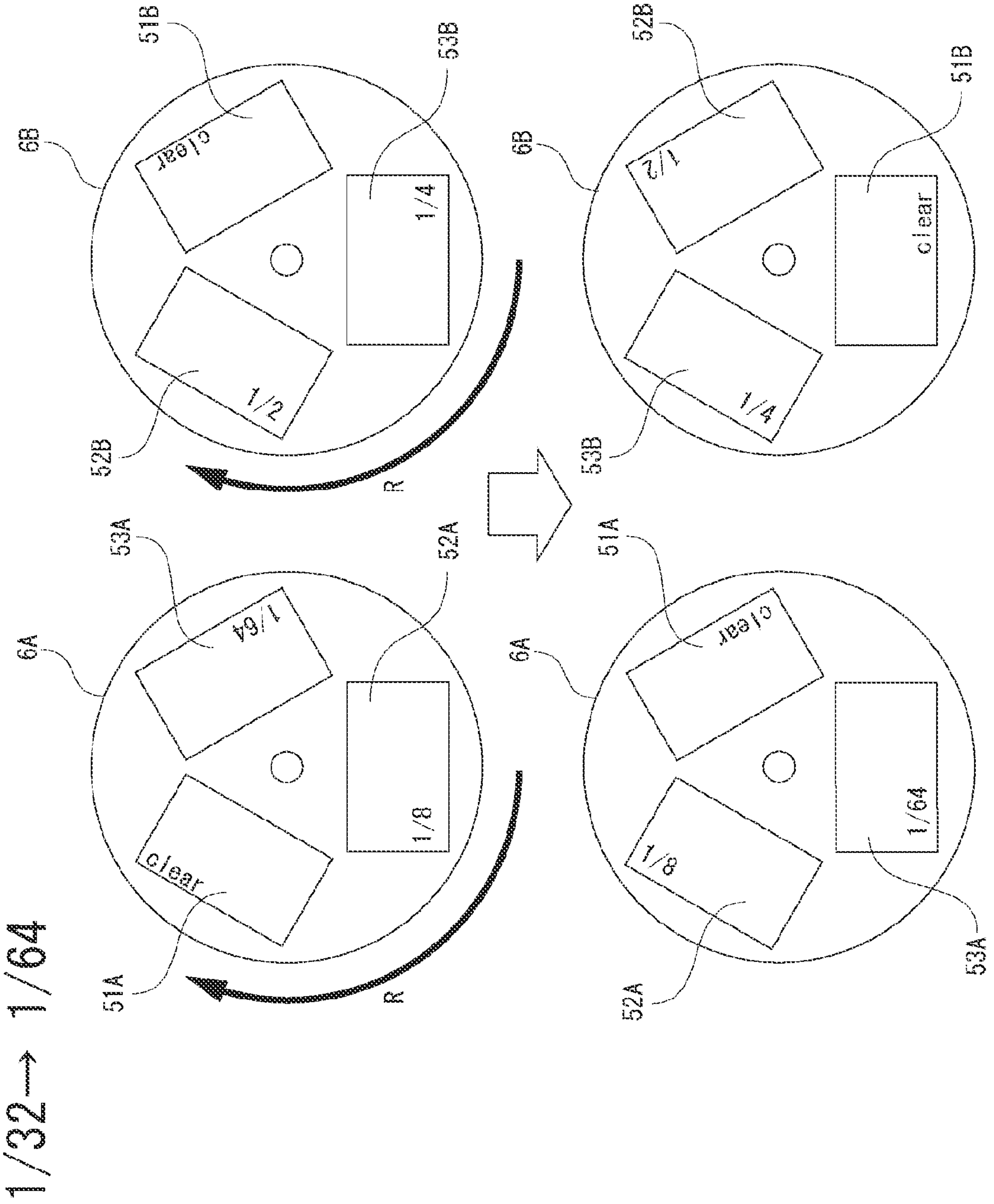
FIG. 22 is an explanatory view of the ND filter unit according to the embodiment in which the transmittance is switched from 1/32 to 1/64.

FIG. 22 illustrates a case where the transmittance is decreased by one level from "1/32" to "1/64".

Before the rotation, the "1/8" optical ND filter 52A of the filter disk 6A and the "1/4" optical ND filter 53B of the filter disk 6B are respectively inserted into the incident optical path.

From this state, both the filter disks 6A and 6B are rotated by 120 degrees in the direction of the arrow R in response to the decrease operation. In this case, the filter disks 6A and 6B are simultaneously rotated (in the case of variable speed, in the same speed) in the same direction by the same displacement amount (both by the rotation amount of 120 degrees).

After this rotation as described above, a state is established in which the "1/64" optical ND filter 53A of the filter disk 6A and the "clear" optical ND filter 51B of the filter disk 6B are respectively inserted into the incident optical path, and the transmittance of the ND filter unit 6 becomes "1/64".

Figure 23:
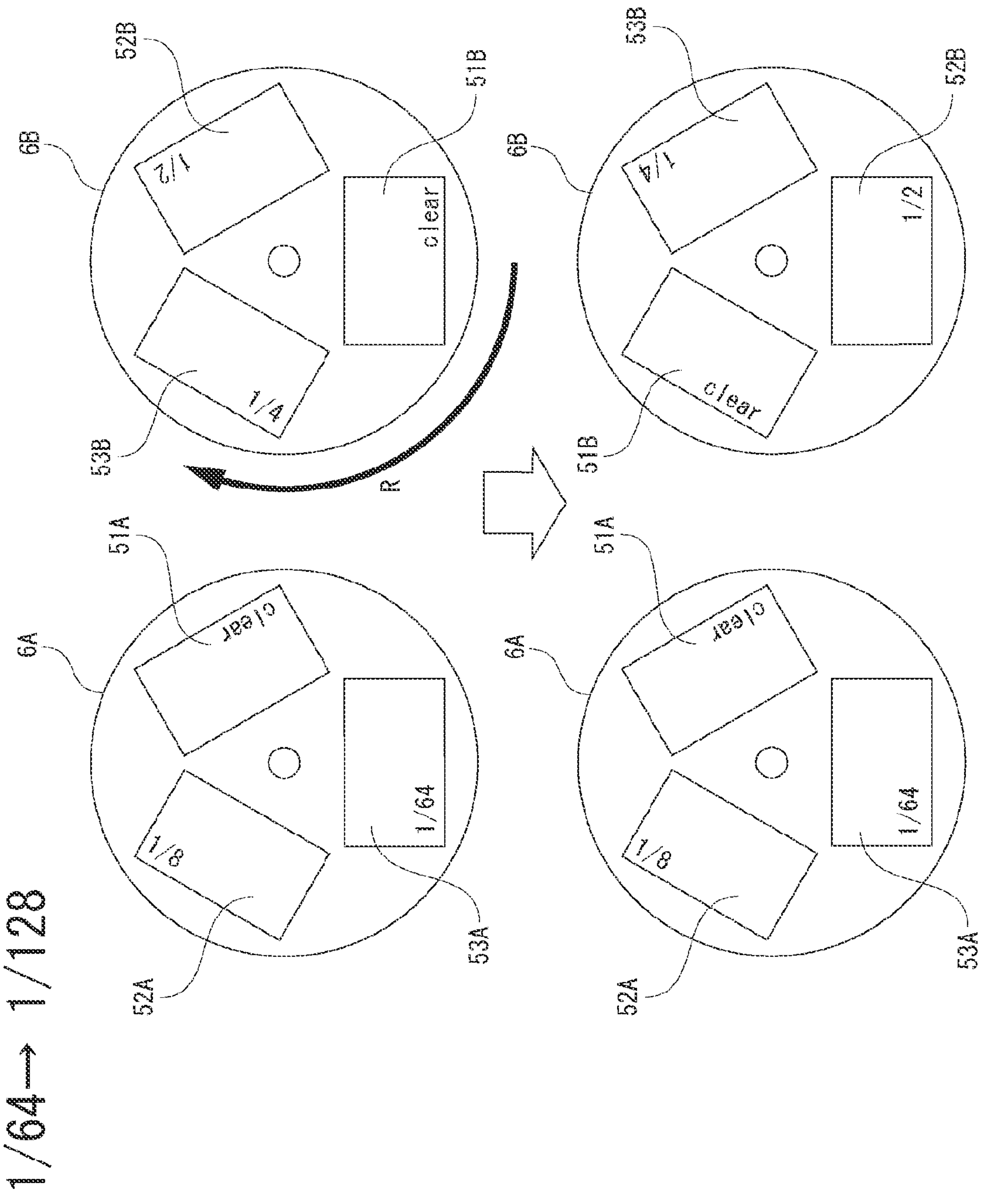
FIG. 23 is an explanatory view of the ND filter unit according to the embodiment in which the transmittance is switched from 1/64 to 1/128.

FIG. 23 illustrates a case where the transmittance is decreased by one level from "1/64" to "1/128". Before the rotation, the "1/64" optical ND filter 53A of the filter disk 6A and the "clear" optical ND filter 51B of the filter disk 6B are respectively inserted into the incident optical path.

From this state, only the filter disk 6B is rotated by 120 degrees in the direction of the arrow R in response to the decrease operation.

After this rotation, a state is established in which the "1/64" optical ND filter 53A of the filter disk 6A and the "1/2" optical ND filter 52B of the filter disk 6B are respectively inserted into the incident optical path, and the transmittance of the ND filter unit 6 becomes "1/128".

Figure 24:
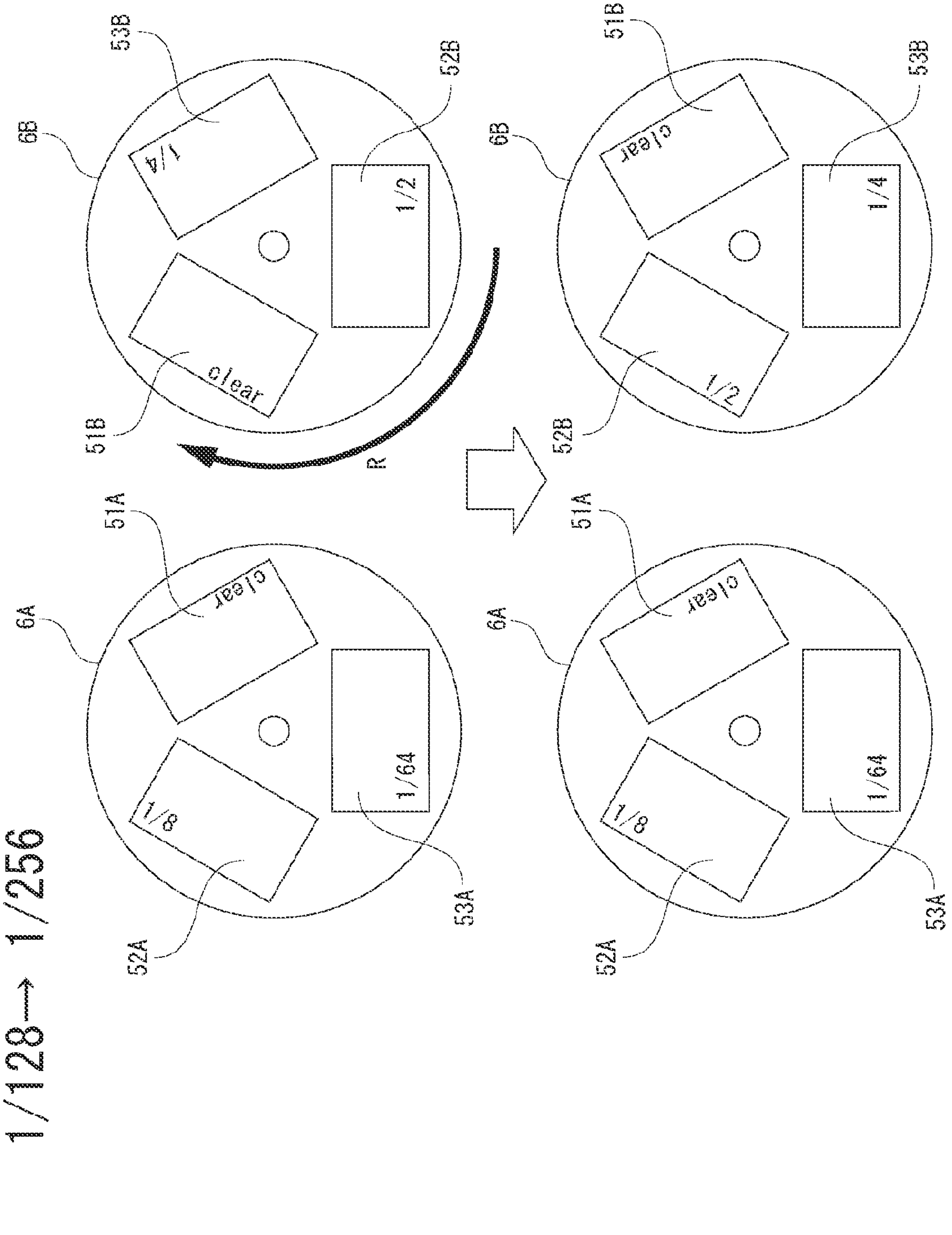
FIG. 24 is an explanatory view of the ND filter unit according to the embodiment in which the transmittance is switched from 1/128 to 1/256.

FIG. 24 illustrates a case where the transmittance is decreased by one level from "1/128" to "1/256". Before the rotation, the "1/64" optical ND filter 53A of the filter disk 6A and the "1/2" optical ND filter 52B of the filter disk 6B are respectively inserted into the incident optical path.

From this state, only the filter disk 6B is rotated by 120 degrees in the direction of the arrow R in response to the decrease operation.

After this rotation, a state is established in which the "1/64" optical ND filter 53A of the filter disk 6A and the "1/4" optical ND filter 53B of the filter disk 6B are respectively inserted into the incident optical path, and the transmittance of the ND filter unit 6 becomes "1/256".

Figure 25:
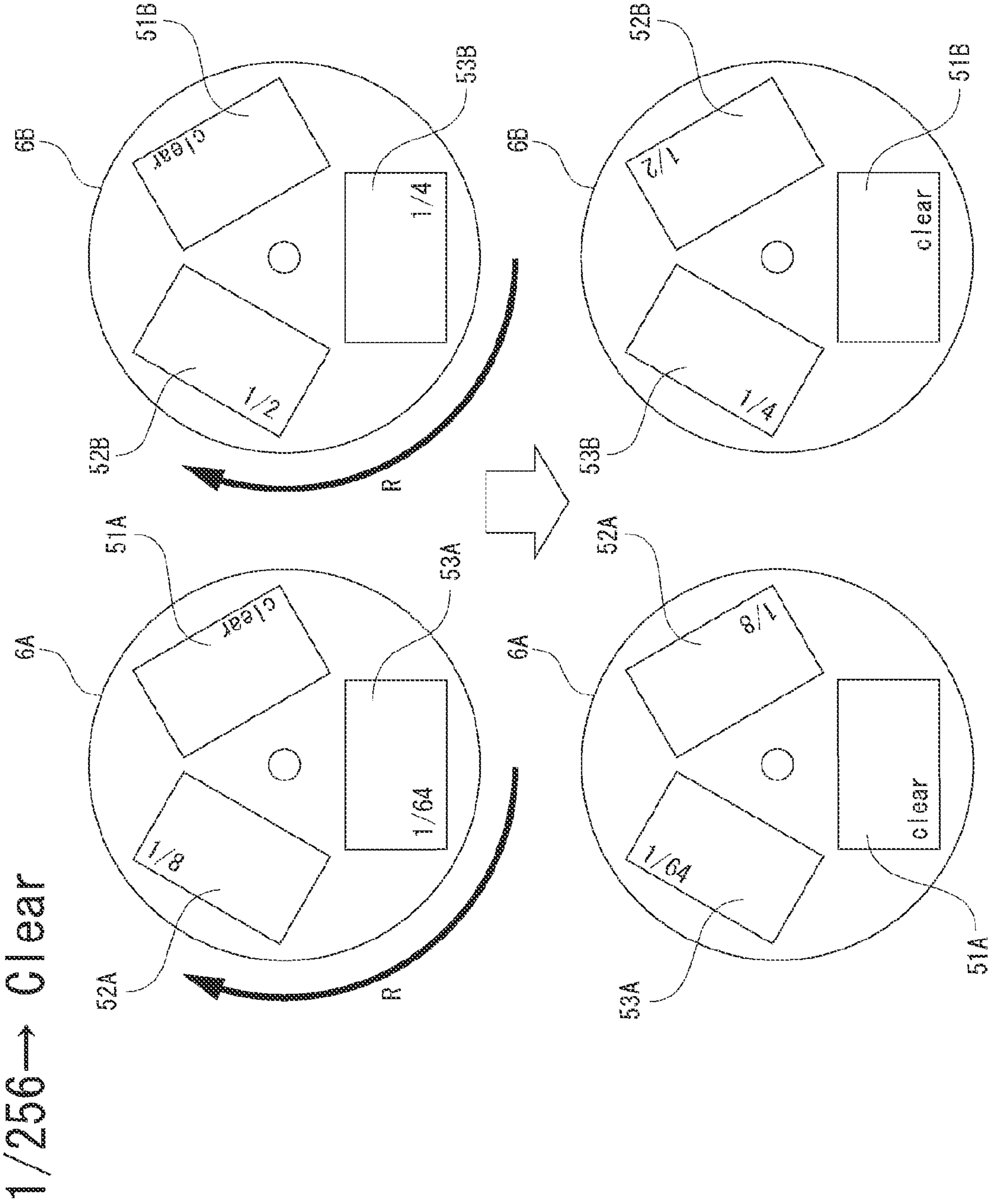
FIG. 25 is an explanatory view of the ND filter unit according to the embodiment in which the transmittance is switched from 1/256 to clear.

FIG. 25 illustrates a case where the transmittance is returned from "1/256" to "clear". The filter disks 6A and 6B of the present embodiment are rotationally driven by an endless rotation mechanism, so that the filter disks 6A and 6B can be returned to clear, which is the maximum transmittance, by the decrease operation from the minimum transmittance.

Before the rotation, the "1/64" optical ND filter 53A of the filter disk 6A and the "1/4" optical ND filter 53B of the filter disk 6B are respectively inserted into the incident optical path.

From this state, both the filter disks 6A and 6B are rotated by 120 degrees in the direction of the arrow R in response to the decrease operation. In this case, the filter disks 6A and 6B are simultaneously rotated (in the case of variable speed, in the same speed) in the same direction by the same displacement amount (both by the rotation amount of 120 degrees).

After this rotation as described above, a state is established in which the "clear" optical ND filter 51A of the filter disk 6A and the "clear" optical ND filter 51B of the filter disk 6B are respectively inserted into the incident optical path, and the transmittance of the ND filter unit 6 becomes "clear".

As illustrated in FIGS. 17 to 25 described above, the transmittance decreases by one level for each decrease operation. Further, in a case where the filter disks 6A and 6B are rotated together, the filter disks 6A and 6B are simultaneously rotated in the same direction by the same displacement amount (rotation amount) to cause the shadows reflected on the monitor display overlap with each other to form only one shadow.

With this arrangement, the user does not feel discomfort in the operation every time the decrease operation is performed, and the operation of stepwise decreasing of the transmittance using the two filter disks 6A and 6B can be performed very easily.

Although the rotation in response to the decrease operation has been described above, for the rotation in response to the increase operation by the user, the rotation in the reverse direction described above in FIGS. 17 to 25 may be considered.

That is, at the time of increasing the transmittance by one level, the state transits from the state of the lower stage to the state of the upper stage in each drawing. The rotation direction is a direction opposite to the arrow R (counterclockwise in each drawing). Further, in a case where the filter disks 6A and 6B are rotated together, the filter disks 6A and 6B are simultaneously rotated in the same direction by the same displacement amount (rotation amount) to cause the shadows reflected on the monitor display overlap with each other to form only one shadow.

Furthermore, because the rotation is endless, the transmittance can transit from the maximum transmittance of "clear" to the minimum transmittance of "1/256" by the one-level increase operation.

4. First Control Processing Example

In order to control the transmittance of the ND filter unit 6, the camera control unit 30 controls the filter drive unit 32 in response to operation information from the operation unit 17, that is, the decrease operation and the increase operation of the transmittance, and outputs the drive signals SP1 and SP2, as necessary, to rotationally drive the filter disks 6A and 6B.

Figure 26:
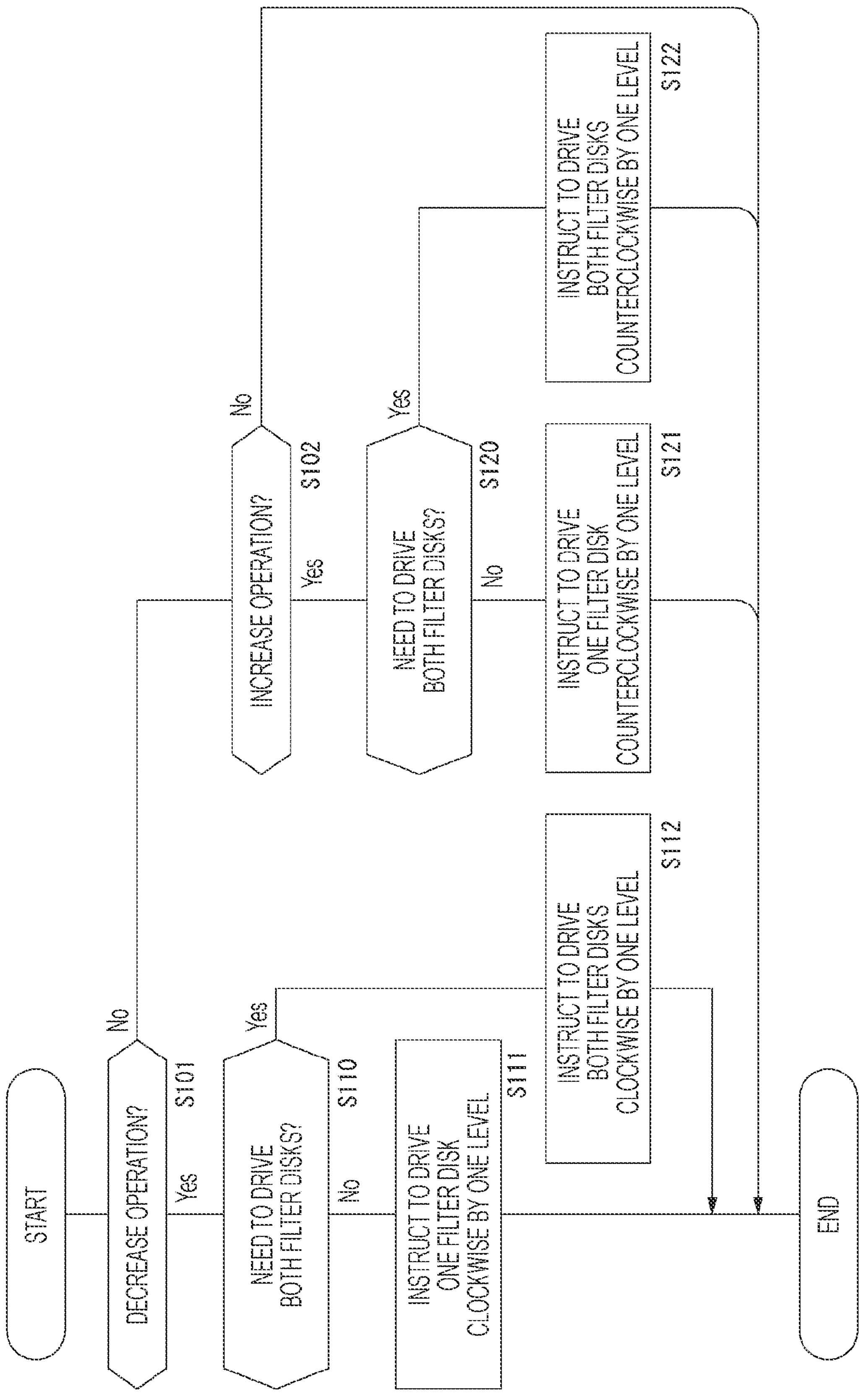
FIG. 26 is a flowchart of a first control processing example.

FIG. 26 illustrates first control processing example of the transmittance control of the ND filter unit 6 by the camera control unit 30. FIG. 26 illustrates a processing example in a case where the camera control unit 30 detects the operation information of the decrease operation or the increase operation from the operation unit 17.

The camera control unit 30 monitors the decrease operation in step S101 and monitors the increase operation in step S102.

In a case where the decrease operation is detected, the camera control unit 30 proceeds from step S101 to step S110, and determines whether or not both disks, that is, both the filter disks 6A and 6B need to be driven in response to the decrease operation this time.

As can be seen from the above description from FIGS. 17 to 25, in a case where the transmittance of the ND filter unit 6 is currently any one of "1/4", "1/32", and "1/256", both the filter disks 6A and 6B are rotated in response to the decrease operation. Meanwhile, in a case where the current transmittance of the ND filter unit 6 is any one of "clear", "1/2", "1/8", "1/16", "1/64", and "1/128", only the filter disk 6B is rotated in response to the decrease operation.

In a case where the operation this time is the case of rotating only the filter disk 6B, the camera control unit 30 proceeds from step S110 to step S111, and outputs the drive instruction SG1 to rotate the filter disk 6B clockwise by 120 degrees as illustrated in FIGS. 17 to 25.

In a case where the operation this time is the case of rotating both the filter disks 6A and 6B, the camera control unit 30 proceeds from step S110 to step S112, and outputs the drive instruction SG1 to rotate the filter disks 6A and 6B simultaneously clockwise by 120 degrees.

Under the control of the camera control unit 30 described above, the switching of the transmittance in the decrease direction described in FIGS. 17 to 25 is executed in the ND filter unit 6.

In a case where the increase operation is detected, the camera control unit 30 proceeds from step S102 to step S120, and determines whether or not both disks, that is, both the filter disks 6A and 6B need to be driven in response to the increase operation this time.

In a case where the current transmittance of the ND filter unit 6 is any one of "1/64", "1/8", and "clear", both the filter disks 6A and 6B are rotated in response to the increase operation. Meanwhile, in a case where the current transmittance of the ND filter unit 6 is any one of "1/256", "1/128", "1/32", "1/16", "1/4", and "1/2", only the filter disk 6B is rotated in response to the increase operation.

In a case where the operation this time is the case of rotating only the filter disk 6B, the camera control unit 30 proceeds from step S120 to step S121, and outputs the drive instruction SG1 to rotate the filter disk 6B counterclockwise by 120 degrees as in the states illustrated in FIGS. 17 to 25.

In a case where the operation this time is the case of rotating both the filter disks 6A and 6B, the camera control unit 30 proceeds from step S120 to step S122, and outputs the drive instruction SG1 to rotate the filter disks 6A and 6B simultaneously counterclockwise by 120 degrees.

Under the control of the camera control unit 30 described above, the switching of the transmittance in the increase direction is executed in the ND filter unit 6.

5. Second Control Processing Example

A second control processing example by the camera control unit 30 is described with reference to FIG. 27. This is an example of a case where the direct operation can be performed together with the increase/decrease operation on the operation unit 17. Alternatively, this may be a case where the increase/decrease operation cannot be performed, and only the direct operation can be performed.

As described above, the direct operation is an operation in which, for example, nine types of transmittances from "clear" to "1/256" can be directly designated by a direct operation element using nine keys or the like.

Figure 27:
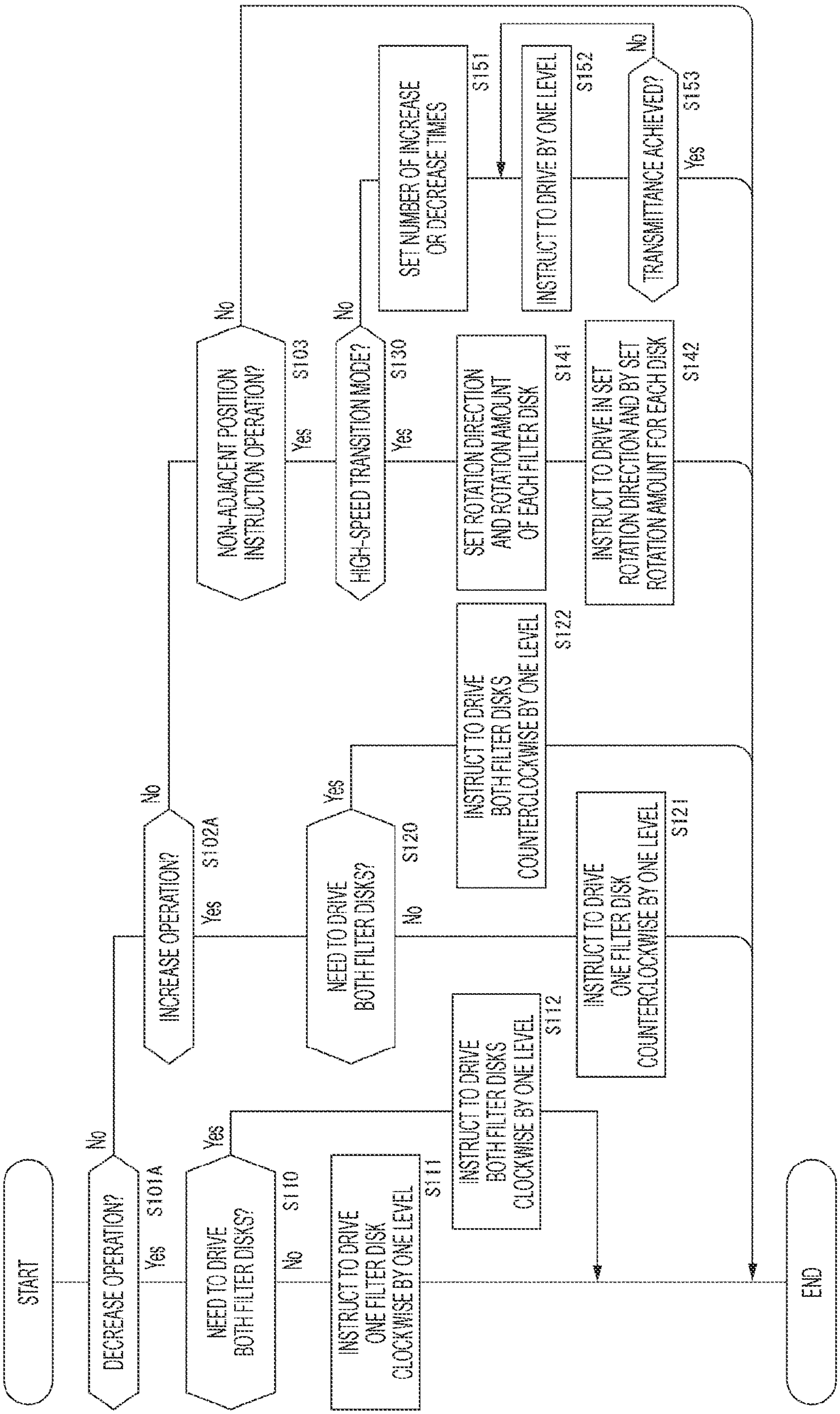
FIG. 27 is a flowchart of a second control processing example.

FIG. 27 illustrates a processing example in a case where the camera control unit 30 detects the operation information of the decrease operation, the increase operation, or the non-adjacent position instruction operation from the operation unit 17.

The camera control unit 30 monitors the decrease operation in step S101A, monitors the increase operation in step S102A, and monitors the non-adjacent position instruction operation in step S103.

In a case where the increase operation, the decrease operation, and the direct operation are possible, the decrease operation monitored in step S101A is either an operation of the decrease operation element or an operation of designating a transmittance position on the low transmittance side by one level from the current transmittance position by the direct operation element.

The transmittance position refers to each position from "clear" to "1/256" in FIG. 7. For example, the transmittance position of "1/2" with respect to the transmittance position of "clear" is the transmittance position adjacent on the low transmittance side.

Note that because the filter disks 6A and 6B have the optical ND filters disposed in the circumferential direction, "clear" and "1/256" are regarded as being adjacent to each other. Therefore, for convenience, the designation of "clear" by the direct operation element from the state of "1/256" is treated as the decrease operation by one level.

Furthermore, the increase operation monitored in step S102A is either an operation of the increase operation element or an operation of designating a transmittance position on the high transmittance side by one level from the current transmittance position by the direct operation element. For example, the transmittance position of "clear" with respect to the transmittance position of "1/2" is the transmittance position adjacent on the high transmittance side.

Furthermore, for convenience, the designation of "1/256" by the direct operation element from the state of "clear" is treated as the increase operation by one level.

The non-adjacent position instruction operation monitored in step S103 is an operation of designating a transmittance position separated from the current transmittance position by two or more levels by the direct operation element. For example, this is an operation of designating "1/8" when the transmittance position is currently "1/2".

Note that, in a case where only the direct operation element is provided for the transmittance operation in the operation unit 17 and the increase/decrease operation cannot be performed, the camera control unit 30 monitors in steps S101A, S102A, and S103 whether the designation operation by the direct operation element instructs a decrease-side transition by one level, an increase-side transition by one level, or a transition of two or more levels from the current transmittance position.

In a case where the decrease operation is detected, the camera control unit 30 advances the process from step S101A to step S110. Then, similarly to the case of FIG. 26, it is determined whether or not both the filter disks 6A and 6B need to be driven in response to the decrease operation this time, and the processing of step S111 or step S112 is performed.

Under the control of the camera control unit 30, the switching of the transmittance in the decrease direction described in FIGS. 17 to 25 is executed in the ND filter unit 6.

In a case where the increase operation is detected, the camera control unit 30 advances the process from step S102A to step S120. Then, similarly to the case of FIG. 26, it is determined whether or not both the filter disks 6A and 6B need to be driven in response to the increase operation this time, and the processing of step S121 or step S122 is performed.

Under the control of the camera control unit 30, the switching of the transmittance in the increase direction is executed in the ND filter unit 6.

In a case where the non-adjacent position instruction operation is detected, the camera control unit 30 advances the process from step S103 to step S130.

In step S130, it is determined whether or not the current mode is a high-speed transition mode.

The high-speed transition mode is a mode for making the most rapid transition to a target transmittance position. For example, ON/OFF of the high-speed transition mode can be optionally selected by the user through an operation.

Then, in a case where the high-speed transition mode is OFF, the camera control unit 30 performs control to cause the target transmittance position to be reached through, for example, the transitions of each of stages in FIGS. 17 to 25. On the other hand, in a case where the high-speed transition mode is ON, the camera control unit 30 rotates the filter disks 6A and 6B to the target rotation position state in the shortest time.

In a case where the high-speed transition mode is OFF, the camera control unit 30 proceeds from step S130 to step S151, and sets the number of times of increase or decrease.

This is processing of setting the number of transitions in the increase direction or the decrease direction from the current transmittance position to the target transmittance position designated by the direct operation element. For example, the number of transitions according to the current transmittance position and the target transmittance position is as follows.

Current "clear" to target "1/4" . . . Decrease twice
Current "1/2" to target "1/16" . . . Decrease three times
Current "1/4" to target "1/64" . . . Decrease four times
Current "1/128" to target "1/4" . . . Decrease four times
Current "1/256" to target "1/64" . . . Increase twice
Current "1/128" to target "1/16" . . . Increase three times
Current "1/64" to target "1/4" . . . Increase four times
Current "1/4" to target "1/128" . . . Increase four times Actually, because there are 7 non-adjacent positions in each of the 9 transmittance positions, there are 63 transition cases. The number of times of increase or decrease is set according to each of the transition cases.

Note that the example described above is an example in which decrease or increase is selected and set so that the target transmittance position is reached with as few number of times of decrease or increase as possible. However, it may be set that the target transmittance position is always reached only by the decrease transition, or the target transmittance position is reached only by the increase transition.

As in these examples, when the number of times of decrease or the number of times of increase is set according to the current transmittance position and the target transmittance position, the camera control unit 30 issues a decrease drive instruction or an increase drive instruction by one level in step S152.

The processing of the decrease drive instruction by one level in this case is similar to the processing in steps S110, S111, and S112. That is, in the transition from the current transmittance position to the next transmittance position, the instruction of step S111 is performed in the case of driving only the filter disk 6B, and the instruction of step S112 is performed in the case of driving both of the filter disks.

Furthermore, the processing of the increase drive instruction by one level in this case is similar to the processing in steps S120, S121, and S122. That is, in the transition from the current transmittance position to the next transmittance position, the instruction of step S121 is performed in the case of driving only the filter disk 6B, and the instruction of step S122 is performed in the case of driving both of the filter disks.

The camera control unit 30 repeats such transmittance position control by one level in step S152 until it is determined in step S153 that the target transmittance position has been reached.

When the decrease instruction or the increase instruction has been issued in step S152 for the number of times set in step S151, it is determined in step S153 that the target transmittance position has been reached.

In this case, even in the case of the transition to the non-adjacent position, in a case where the filter disks 6A and 6B are rotated together, the filter disks are rotated by the same displacement amount (rotation amount) in the same direction at the same time point, and the reflected shadows of the filter disks 6A and 6B are visually recognized in an overlapping manner.

For example, when the user gives an instruction to change the transmittance position by three levels at once, a state in which the shadows run three times is visually recognized on the monitor display, which causes the user not to feel discomfort.

In a case where it is determined in step S130 that the high-speed transition mode is ON, the camera control unit 30 proceeds to step S141.

In step S141, the camera control unit 30 sets the rotation direction and the rotation amount of the filter disks 6A and 6B. That is, in order to reach the target transmittance position from the current transmittance position, how much each of the filter disks 6A and 6B is rotated in which rotation direction at the shortest time is set. For example, the following is performed.

Current "clear" to target "1/4" . . . Rotate filter disk 6B counterclockwise by 120 degrees Current "1/2" to target "1/16" . . . Rotate filter disk 6A clockwise by 120 degrees Current "1/4" to target "1/64" . . . Rotate filter disk 6A counterclockwise by 120 degrees and rotate filter disk 6B counterclockwise by 120 degrees Current "1/128" to target "1/4" . . . Rotate filter disk 6A clockwise by 120 degrees and rotate filter disk 6B clockwise by 120 degrees Current "clear" to target "1/128" . . . Rotate filter disk 6A counterclockwise by 120 degrees and rotate filter disk 6B clockwise by 120 degrees Current "1/128" to target "clear" . . . Rotate filter disk 6A clockwise by 120 degrees and rotate filter disk 6B counterclockwise by 120 degrees For example, after setting the rotation direction and the rotation amount of the filter disks 6A and 6B as in these examples, in step $142, the camera control unit 30 outputs the drive instruction SG1 to the filter drive unit 32 so as to execute the set rotation operation.

As a result, each of the filter disks 6A and 6B performs necessary rotation to reach the target transmittance position.

In this case, because the filter disks 6A and 6B are not necessarily rotated in the same direction, there are cases where the filter disks 6A and 6B do not overlap with each other regarding the shadows reflected on the monitor display, but a quick transition is realized.

Under the control of the camera control unit 30 as in FIG. 27 described above, the switching of the transmittance in the increase direction is also executed in response to the direct operation in the ND filter unit 6.

Note that, in FIG. 27, the processing is performed according to the ON/OFF of the high-speed transition mode, but the operation in the high-speed transition mode may always be performed in the case of the transition to the non-adjacent position.

In this case, the process is made to directly proceed from step S103 to step S141.

Furthermore, even in the case of the transition to the non-adjacent position, the operation in the case where the high-speed transition mode is OFF may be always performed. In this case, the process is made to directly proceed from step $103 to step S151. In this case, regardless of the transition to the adjacent position or the transition to the non-adjacent position, in a case where the two filter disks 6A and 6B are rotated, the two filter disks 6A and 6B are rotationally driven simultaneously in the same direction by the same displacement amount.

6. Other Configuration Examples of ND Filter Unit

In the embodiments described above, an example in which each of the filter disks 6A and 6B includes three optical ND filters has been described, but an example in which each of the filter disks 6A and 6B includes four or five optical ND filters is described.

Figure 28:
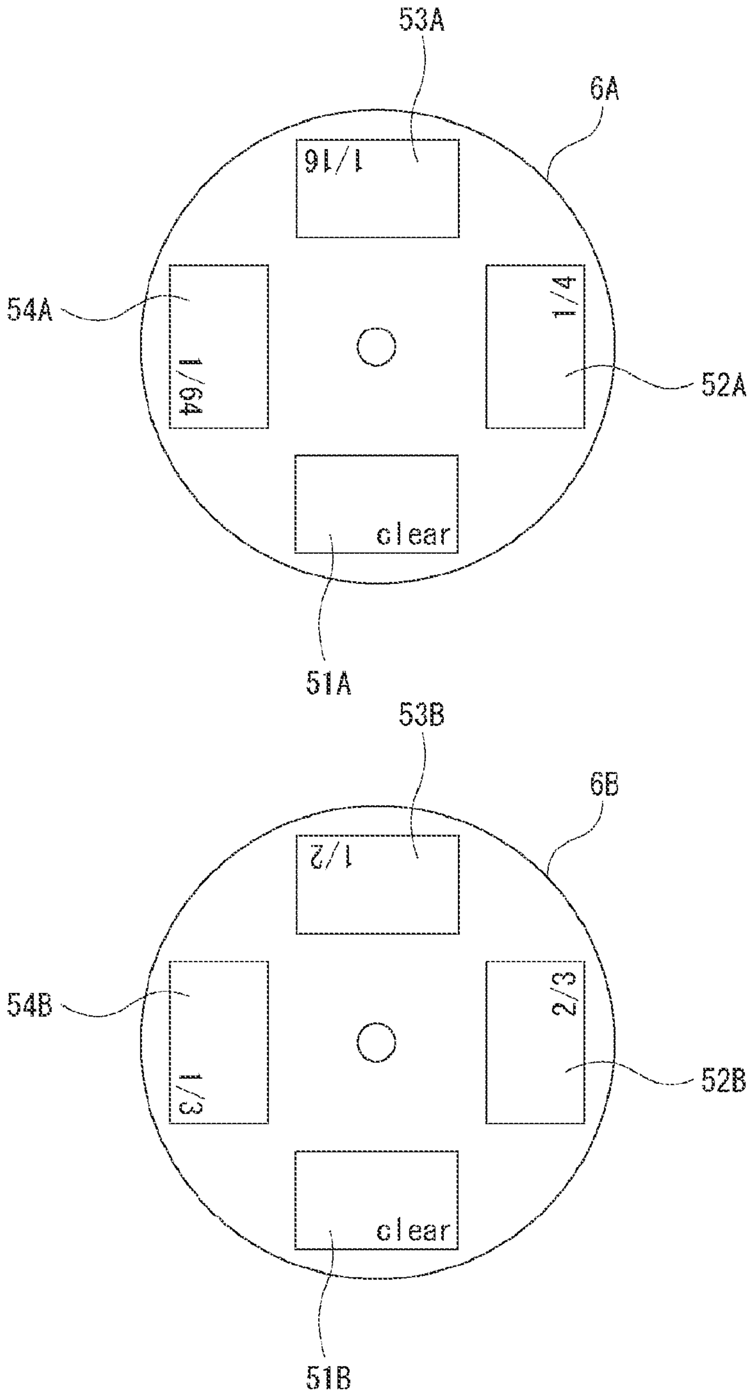
FIG. 28 is an explanatory view of another configuration example of the ND filter unit according to the embodiment.

In the example in FIG. 28, four optical ND filters 51A, 52A, 53A, and 54A are mounted on the filter disk 6A. The optical ND filters 51A, 52A, 53A, and 54A are disposed side by side in a positional state at an equal angle of 90 degrees in the circumferential direction.

The transmittances of the optical ND filters 51A, 52A, 53A, and 54A are "clear", "1/4", "1/16", and "1/64", respectively. Therefore, the filters are aligned in the order of decreasing transmittance in the counterclockwise direction in the drawing.

Furthermore, four optical ND filters 51B, 52B, 53B, and 54B are also mounted on the filter disk 6B. The optical ND filters 51B, 52B, 53B, and 54B are disposed side by side in a positional state at an equal angle of 90 degrees in the circumferential direction.

The transmittances of the optical ND filters 51B, 52B, 53B, and 54B are "clear", "2/3", "1/2", and "1/3", respectively. Therefore, the filters are aligned in the order of decreasing transmittance in the counterclockwise direction in the drawing.

That is, in the filter disk 6A, four optical ND filters in which the change width between the transmittances is coarse are disposed at equal intervals in the order of transmittance in the circumferential direction, and in the filter disk 6B, four optical ND filters in which the change width between the transmittances is dense are disposed at equal intervals in the order of transmittance in the circumferential direction.

With such filter disks 6A and 6B, the transmittance of the ND filter unit 6 is varied in 16 levels as shown as total transmittances in FIG. 29.

Further, in the case of the decrease operation and the increase operation of the transmittance position, both of the filter disks 6A and 6B are rotated in the following cases.

- Case where total transmittance is decreased from current "1/3" to "1/4"
- Case where total transmittance is decreased from current "1/12" to "1/16"
- Case where total transmittance is decreased from current "1/48" to "1/64"
- Case where total transmittance is made to transit by decrease rotation from current "1/192" to "clear"
- Case where total transmittance is increased from current "1/4" to "1/3"
- Case where total transmittance is increased from current "1/16" to "1/12"
- Case where total transmittance is increased from current "1/64" to "1/48"
- Case where total transmittance is made to transit by increase rotation from current "clear" to "1/192"

In these cases, the filter disks 6A and 6B are simultaneously driven in the same direction by the same displacement amount (rotation amount of 90 degrees), so that operability without discomfort can be realized.

Furthermore, the decrease transition and the increase transition by one level other than the above cases may be 90 degree rotation of only the filter disk 6B.

Figure 30:
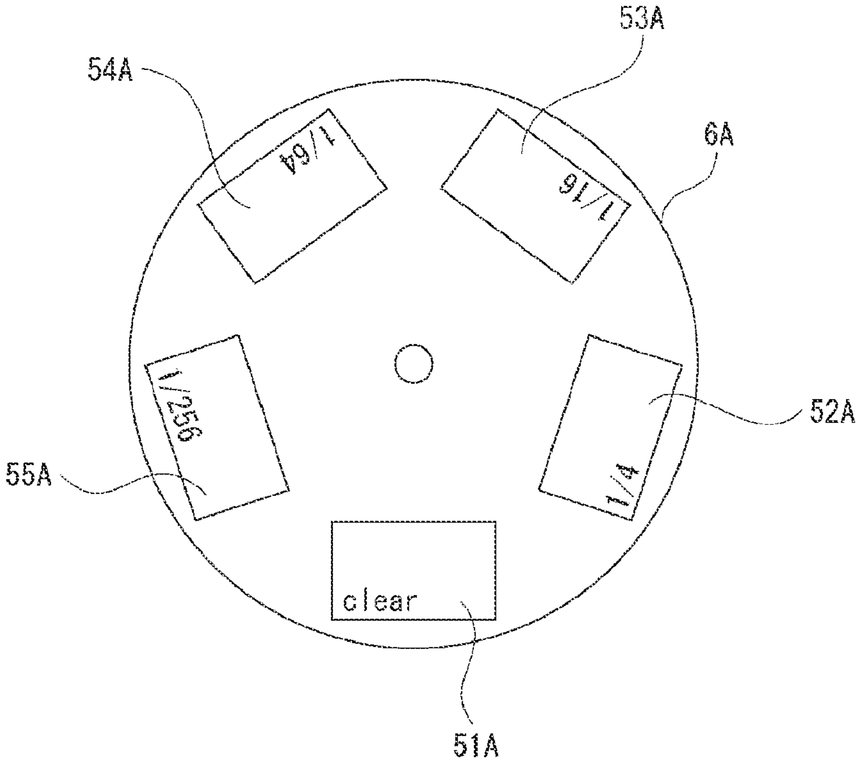
FIG. 30 is an explanatory view of yet another configuration example of the ND filter unit according to the embodiment.
Figure 30:
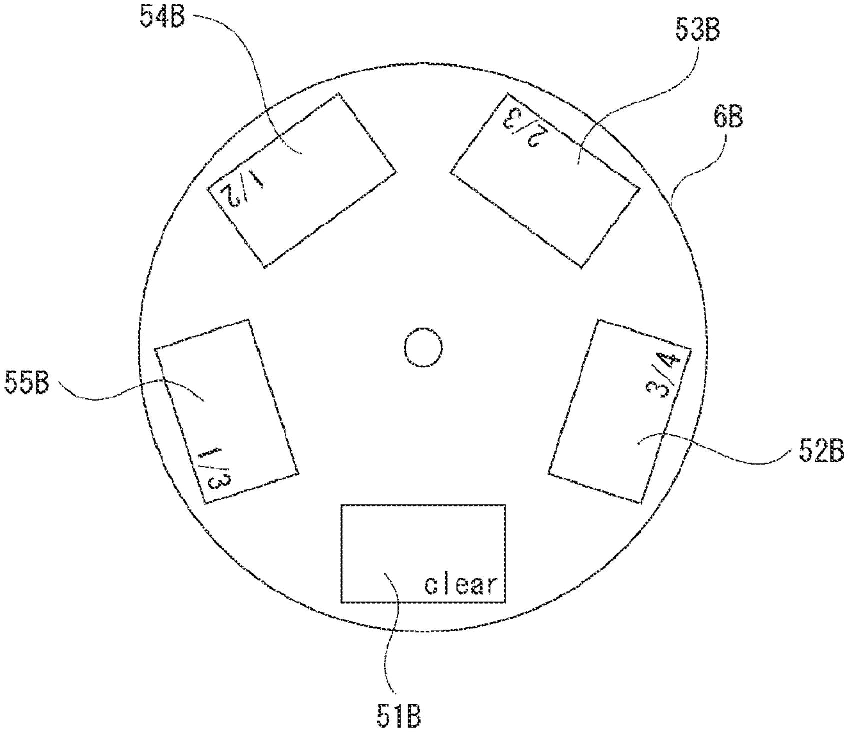

In the example in FIG. 30, five optical ND filters 51A, 52A, 53A, 54A, and 55A are mounted on the filter disk 6A. The optical ND filters 51A, 52A, 53A, 54A, and 55A are disposed side by side in a positional state at an equal angle of 72 degrees in the circumferential direction. The transmittances of the optical ND filters 51A, 52A, 53A, 54A, and 55A are "clear", "1/4", "1/16", "1/64", and "1/256", respectively. Therefore, the filters are aligned in the order of decreasing transmittance in the counterclockwise direction in the drawing.

Furthermore, five optical ND filters 51B, 52B, 53B, 54B, and 55B are also mounted on the filter disk 6B. The optical ND filters 51B, 52B, 53B, 54B, and 55B are disposed side by side in a positional state at an equal angle of 72 degrees in the circumferential direction. The transmittances of the optical ND filters 51B, 52B, 53B, 54B, and 55B are "clear", "3/4", "2/3", "1/2", and "1/3", respectively. Therefore, the filters are aligned in the order of decreasing transmittance in the counterclockwise direction in the drawing.

That is, in the filter disk 6A, five optical ND filters in which the change width between the transmittances is coarse are disposed at equal intervals in the order of transmittance in the circumferential direction, and in the filter disk 6B, five optical ND filters in which the change width between the transmittances is dense are disposed at equal intervals in the order of transmittance in the circumferential direction.

With such filter disks 6A and 6B, the transmittance of the ND filter unit 6 is varied in 25 levels as shown as a total transmittance in FIG. 31.

Further, in the case of the decrease operation and the increase operation of the transmittance position, both of the filter disks 6A and 6B are rotated in the following cases.

- Case where total transmittance is decreased from current "1/3" to "1/4"
- Case where total transmittance is decreased from current "1/12" to "1/16"
- Case where total transmittance is decreased from current "1/48" to "1/64"
- Case where total transmittance is decreased from current "1/192" to "1/256"
- Case where total transmittance is made to transit by decrease rotation from current "1/768" to "clear"
- Case where total transmittance is increased from current "1/4" to "1/3"
- Case where total transmittance is increased from current "1/16" to "1/12"
- Case where total transmittance is increased from current "1/64" to "1/48"
- Case where total transmittance is increased from current "1/256" to "1/192"
- Case where total transmittance is made to transit by increase rotation from current "clear" to "1/768"

In these cases, the filter disks 6A and 6B are simultaneously driven in the same direction by the same displacement amount (rotation amount of 72 degrees), so that operability without discomfort can be realized.

Furthermore, the decrease transition and the increase transition by one level other than the above cases may be 72 degree rotation of only the filter disk 6B.

7. Summary and Modifications

According to the embodiment described above, the following effects can be obtained.

The imaging device 10 according to the embodiment includes: the imaging element 12; and the ND filter unit 6 including the plurality of filter holders, each of the filter holders being mounted with the plurality of optical ND filters having different transmittances and being able to selectively insert the optical ND filters into the incident optical path for the imaging element 12. The plurality of filter holders is, for example, the filter disks 6A and 6B. Further, the camera control unit 30 can variably set the transmittance of the ND filter unit 6 by performing drive control to switch the optical ND filter to be inserted into the incident optical path for each of the plurality of filter holders. In this case, in a case where driving of the plurality of filter holders is required for switching to the target transmittance, the control is performed such that the plurality of filter holders to be driven is simultaneously displaced in the same direction by the same displacement amount.

With this arrangement, the shadow reflected in the imaging element 12 can be prevented from being separate shadows for each filter holder, and when the plurality of filter holders moves, it can be made to appear as if one filter holder is moving, and the operation that does not cause the user to feel discomfort can be realized without deteriorating the operability. That is, the operability without discomfort can be provided without adopting a method of causing the user to perform an operation for each of the plurality of filter holders.

Note that the filter disks 6A and 6B are assumed as the filter holder, but the filter holder is not limited to a disk-shaped filter holder, and a rectangular plate-like filter holder is also conceivable.

In the embodiment, the filter holder is configured such that the plurality of optical ND filters is mounted side by side in the circumferential direction to enable the optical ND filter to be selectively inserted into the incident optical path by the rotation operation. The filter disks 6A and 6B are exemplified as such a filter holder. Further, in a case where the drive control of the plurality of filter disks 6A and 6B for switching to the target transmittance is performed, the camera control unit 30 performs control so that the plurality of filter disks 6A and 6B to be driven simultaneously rotates in the same rotation direction by the same rotation amount.

At the time of rotationally driving the plurality of filter disks 6A and 6B, by simultaneously rotating the plurality of filter disks 6A and 6B in the same rotation direction by the same rotation amount, the shadows of the ND filter reflected in the imaging element 12 can be made to appear as if one filter disk is rotating.

Then, for example, by using the two filter disks 6A and 6B and allowing the transmittance to be set in combination, the transmittance can be set in larger number of levels, and fine image expression becomes possible by adjusting the amount of light by the ND filter unit 6. Furthermore, the number of levels that the transmittance can be set can be increased without causing the filter disk to become larger, and thus without causing the main body part 1 to become larger.

Then, for example, when the user performs an operation of decreasing or increasing the transmittance by one level, the shadows of the rotation of the filter disks 6A and 6B displayed on the monitor appear as if one filter disk is rotating, and thus, the switching operation without causing the user to feel discomfort can be realized.

Note that the filter holder, which is configured to enable the optical ND filter to be selectively inserted into the incident optical path by the rotation operation, is not limited to a true circular filter disk such as the filter disks 6A and 6B. For example, filter holders having various shapes such as a shape in which a part of a circle is cut out, a polygonal shape such as a triangle, a quadrangle, and a pentagon, and a star-like shape are conceivable.

In the embodiment, in the filter disk 6A, the plurality of optical ND filters in which the change width between the transmittances by one level is coarse is arranged in the order of transmittance in the circumferential direction, and in the filter disk 6B, the plurality of optical ND filters in which the change width between the transmittances by one level is dense, the change width being obtained by further dividing the change width between the transmittances by one level of the optical ND filter 6A, is arranged in the order of transmittance in the circumferential direction (see FIGS. 7, 29, and 31).

With this arrangement, the transmittance can be set in multiple levels by the combination of the two filter disks 6A and 6B. That is, in a case where each of the filter disks 6A and 6B has three optical ND filters, the transmittance can be set at 3×3, that is, 9 levels, in a case where each of the filter disks 6A and 6B has four optical ND filters, the transmittance can be set at 4×4, that is, 16 levels, and in a case where each of the filter disks 6A and 6B has five optical ND filters, the transmittance can be set at 5×5, that is, 25 levels.

In the embodiment, an example has been described in which the camera control unit 30 changes the transmittance by the ND filter unit 6 level by level by performing the control of rotating the filter disk 6B in a state where the filter disk 6A is fixed and the control of simultaneously rotating the filter disks 6A and 6B in the same rotation direction by the same rotation amount, in a predetermined order.

For example, as in FIGS. 6A and 6B, in the filter disk 6A, the optical ND filters 51A, 52A, and 53A in which the change width is coarse are arranged in the order of transmittance in the circumferential direction, and in the filter disk 6B, the optical ND filters 51B, 52B, and 53B in which the change width is dense are arranged in the order of transmittance in the circumferential direction. In this case, as illustrated in FIGS. 17 to 25, by performing the control of rotating the filter disk 6B in a state where the filter disk 6A is fixed and the control of simultaneously rotating the filter disks 6A and 6B in the same rotation direction by the same rotation amount, in a predetermined order, the control in which the transmittance decreases or increases level by level is realized.

That is, by a combination of the driving of only the filter disk 6B and the simultaneous driving of the filter disks 6A and 6B, the control in which the transmittance decreases or increases level by level is realized.

The plurality of filter disks 6A and 6B according to the embodiment is configured to be endlessly rotatable. With this arrangement, the two filter disks 6A and 6B can switch from the optical ND filter having the minimum transmittance to the optical ND filter having the maximum transmittance, and vice versa, and the efficient rotation operation can be performed.

The filter disks 6A and 6B according to the embodiment each includes the plurality of optical ND filters including the clear filter.

With this arrangement, the two filter disks 6A and 6B can be used to set a plurality of levels from a state without light reduction to a state of the minimum transmittance.

In the embodiment, among transmittances that can be set, in a case where switching to the transmittance located adjacent in the order of transmittance is intended, and in a case where driving of both of the plurality of filter disks 6A and 6B is required, the camera control unit 30 performs control such that the plurality of filter holders to be driven are simultaneously displaced in the same direction by the same displacement amount.

As in steps S110 to S112 and steps S120 to S122 in FIGS. 26 and 27, when the switching to the adjacent transmittance is performed in order, by making the filter holders appear as if one filter holder is moving level by level, the user feels the least discomfort.

In particular, when the shadows of the plurality of filter disks 6A and 6B are reflected as separate movements by one level of the increase operation or the decrease operation, the user tends to feel that the transmittance has changed by more than one level. Therefore, in the case of one level of the decrease operation or the increase operation, it is preferable to perform the control such that the plurality of filter disks 6A and 6B is simultaneously displaced in the same direction by the same displacement amount.

In the embodiment, an example has also been described in which, among transmittances that can be set, in a case where switching to the transmittance not located adjacent in the order of transmittance is intended, and in a case where driving of both of the plurality of filter disks 6A and 6B is required, the camera control unit 30 performs control such that the plurality of filter disks 6A and 6B to be driven is simultaneously displaced in the same direction by the same displacement amount.

As in steps S151, S152, and S153 in FIG. 27, the switching is performed level by level also at the time of switching to the non-adjacent transmittance, and during the switching, by simultaneously rotating the filter disks 6A and 6B in the same rotation direction by the same rotation amount when the filter disks 6A and 6B are simultaneously rotated, the user can be prevented from visually recognizing the shadows that causes the user to feel discomfort.

In the embodiment, an example has also been described in which, among transmittances that can be set, in a case where switching to the transmittance not located adjacent in the order of transmittance is intended, and in a case where driving of both of the plurality of filter disks 6A and 6B is required, the camera control unit 30 individually sets the shortest displacement amount and the displacement direction for the plurality of filter disks 6A and 6B to be driven to perform the drive control.

As in steps S141 and S142 in FIG. 27, at the time of switching to the non-adjacent transmittance, the transmittance can be quickly switched by individually setting the shortest rotation amount and rotation direction for each of the filter disks 6A and 6B and rotating the filter disks 6A and 6B. This is effective control in a case where quick switching of the transmittance is required.

In the embodiment, an example has also been described in which, among transmittances that can be set, as the control mode in a case where switching to the transmittance not located adjacent in the order of transmittance is intended, the modes can be selected, the modes including the mode in which the plurality of filter disks 6A and 6B to be driven is simultaneously displaced in the same direction by the same displacement amount and the mode in which the shortest displacement amount and the displacement direction for the plurality of filter disks 6A and 6B to be driven are individually set to perform the drive control. That is, selecting of ON/OFF of the high-speed transition mode.

The camera control unit 30 determines, in step S130 in FIG. 27 that whether or not the current mode is the high-speed transition mode. When the user selects ON/OFF of the high-speed transition mode, the processing of steps S151, S152, and S153 and the processing of steps S141 and S142 are selectively executed. Therefore, by selecting ON/OFF of the high-speed transition mode according to the user's own convenience or purpose, the user can select whether the priority of the switching operation to the non-adjacent transmittance is an operation without discomfort or rapidity.

In the embodiment, an example has been described in which the integrated or separate operation unit 17 is provided, the operation unit giving an instruction to sequentially switch the transmittance of the ND filter unit 6 in the order of transmittance.

The user can switch the transmittance by the increase operation or the decrease operation using the operation unit 17. In such an operation environment, by simultaneously rotating the filter disks 6A and 6B in the same rotation direction by the same rotation amount, the user can feel the ND filter as illustrated in FIG. 6C, and obtain a good operational feeling.

Furthermore, the user can perform the transmittance operation more easily than individually operating the two filter disks 6A and 6B.

In the embodiment, an example has been described in which the integrated or separate operation unit 17 is provided, the operation unit being able to optionally designate the transmittance that can be set by the ND filter unit 6.

The user can switch the transmittance by the direct operation using the operation unit 17. In such an operation environment, by selecting ON/OFF of the high-speed transition mode, it becomes possible to select whether to prioritize a natural operational feeling or rapidity.

The technology of the present disclosure is not limited to the example described in the embodiment described above, and various modifications are conceivable. In the example described above, the ND filter unit 6 is provided between the lens barrel 2 and the imager unit 7, but for example, the ND filter unit 6 may be built in the lens barrel 2 side or mounted on the front surface of the lens barrel 2. Also in this case, the control processing of the present disclosure can be applied.

Furthermore, although the ND filter unit 6 has been described to include the two filter disks 6A and 6B, three or more filter disks (filter holders) may be provided.

For example, in a case where three filter disks are to be provided in the ND filter unit 6 and in a case where the two or three filter disks are to be rotated for the switching operation to the target transmittance, the camera control unit 30 performs control so that the plurality of filter disks to be driven simultaneously rotates in the same rotation direction by the same rotation amount. In a case where four or more filter disks are provided, in a case where at least two or more filter disks are to be rotated, the camera control unit 30 is only required to perform control so that the plurality of filter disks to be driven simultaneously rotates in the same rotation direction by the same rotation amount.

Furthermore, although the filter disks 6A and 6B have been described as being rotated by motor drive, a mechanical mechanism such as a cam mechanism may be configured to cause the filter disks to be rotationally driven by only one motor or manually.

Although an example of providing the "clear" optical ND filter in the filter disks 6A and 6B has been described, depending on optical system design conditions and the like, the "clear" filter may be formed as a simple hole on the filter disks 6A and 6B without having an actual filter provided. Such a "hole" is also treated as the "clear" optical ND filter, and the technology of the present disclosure can be applied.

Furthermore, each of the optical ND filters mounted on the filter disks 6A and 6B is described as a fixed transmittance optical ND filter having a fixed transmittance, but a liquid crystal ND filter having a variable transmittance may be used as a part of the ND filters. For example, in a case where the liquid crystal ND filter is used, the technology of the present disclosure can be applied to a case where the transmittance of the liquid crystal ND filter is not changed.

A program according to the embodiment is a program for causing an arithmetic processing device such as a CPU to execute the control processing on the ND filter unit 6 described above.

That is, the program according to the embodiment is a program that causes the arithmetic processing device to execute control on the ND filter unit 6 including the plurality of filter holders (such as the filter disks 6A and 6B), each of the filter holders being mounted with the plurality of optical ND filters having different transmittances and being able to selectively insert the optical ND filters into the incident optical path for the imaging element 12, each of the filter holders being able to have the transmittance variably set by switching the optical ND filter to be inserted into the incident optical path, the program causing the arithmetic processing unit to execute the control on the ND filter unit 6 such that, in a case where driving of the plurality of filter holders is required for switching to the target transmittance, the plurality of filter holders to be driven is simultaneously displaced in the same direction by the same displacement amount.

With such a program, the function of the camera control unit 30 described above can be realized by an arithmetic processing device such as a microcomputer.

These programs can be recorded in advance in an HDD as a recording medium built in a device such as a computer device, a ROM in a microcomputer having a CPU, or the like. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program may be installed from the removable recording medium into a personal computer or the like, or may be downloaded from a download site via a network such as a local area network (LAN) or the Internet.

Note that the effects described in the present description are merely examples and are not limited, and other effects may be provided.

Note that the present technology can also have the following configurations.

(1)

An imaging device including:

an imaging element;

a neutral density (ND) filter unit including a plurality of filter holders, each of the filter holders being mounted with a plurality of optical ND filters having different transmittances and being able to selectively insert the optical ND filters into an incident optical path for the imaging element; and a control unit that can variably set the transmittance of the ND filter unit by performing drive control of switching the optical ND filter to be inserted into the incident optical path for each of the plurality of filter holders, and in a case where driving of the plurality of filter holders is required for switching to a target transmittance, performs control such that the plurality of filter holders to be driven is simultaneously displaced in the same direction by the same displacement amount.

(2)

The imaging device according to (1) described above, in which the filter holders each have a configuration in which a plurality of optical ND filters is mounted side by side in a circumferential direction and the optical ND filters are selectively inserted into the incident optical path by a rotation operation, and in a case where drive control of the plurality of filter holders is performed for switching to a target transmittance, the control unit performs control such that the plurality of filter holders to be driven simultaneously rotates in the same rotation direction by the same rotation amount.

(3)

The imaging device according to (2) described above, in which the filter holders includes a first filter holder and a second filter holder, the first filter holder includes a plurality of optical ND filters in which a change width between transmittances by one level is coarse, the plurality of optical ND filters being arranged in the order of transmittance in the circumferential direction, and the second filter holder includes a plurality of optical ND filters in which a change width between transmittances by one level is dense, the change width being obtained by further dividing the change width between the transmittances by one level of the optical ND filters in the first filter holder into a plurality of levels, the plurality of optical ND filters being arranged in the order of transmittance in the circumferential direction.

(4)

The imaging device according to (3) described above, in which the control unit changes the transmittance by the ND filter unit level by level by performing control of rotating the second filter holder in a state where the first filter holder is fixed and control of simultaneously rotating the first filter holder and the second filter holder in the same rotation direction by the same rotation amount, in a predetermined order.

(5)

The imaging device according to any one of (2) to (4) described above, in which the plurality of filter holders is configured to be endlessly rotatable.

(6)

The imaging device according to any one of (2) to (5) described above, in which the plurality of filter holders each includes a plurality of optical ND filters including a clear filter.

(7)

The imaging device according to any one of (1) to (6) described above, in which, among transmittances that can be set, in a case where the filter holder is driven in the intention of switching to the transmittance located adjacent in the order of transmittance, and in a case where driving of the plurality of filter holders is required, the control unit performs control such that the plurality of filter holders to be driven is simultaneously displaced in the same direction by the same displacement amount.

(8)

The imaging device according to any one of (1) to (7) described above, in which, among transmittances that can be set, in a case where the filter holder is driven in the intention of switching to the transmittance not located adjacent in the order of transmittance, and in a case where the plurality of filter holders is required to be driven, the control unit performs control such that the plurality of filter holders to be driven is simultaneously displaced in the same direction by the same displacement amount.

(9)

The imaging device according to any one of (1) to (7) described above, in which, among transmittances that can be set, in a case where the filter holder is driven in the intention of switching to the transmittance not located adjacent in the order of transmittance, and in a case where the plurality of filter holders is required to be driven, the control unit individually sets the shortest displacement amount and the displacement direction for the plurality of filter holders to be driven to perform drive control.

(10)

The imaging device according to any one of (1) to (7) described above, in which, among transmittances that can be set, as a control mode in a case where the filter holder is driven in the intention of switching to the transmittance not located adjacent in the order of transmittance, modes can be selected, the modes including:

a mode in which the plurality of filter holders to be driven is simultaneously displaced in the same direction by the same displacement amount; and a mode in which the shortest displacement amount and the displacement direction for the plurality of filter holders to be driven are individually set to perform drive control.

(11)

The imaging device according to any one of (1) to (10) described above, further including an operation unit provided integrally or separately, the operation unit giving an instruction to sequentially switch the transmittance of the ND filter unit in the order of transmittance.

(12)

The imaging device according to any one of (1) to (11) described above, further including an operation unit provided integrally or separately, the operation unit being able to optionally designate a transmittance that can be set by the ND filter unit.

(13)

The imaging device according to any one of (1) to (12) described above, in which each of the filter holders is a filter disk.

(14)

A control method including controlling a neutral density (ND) filter unit including a plurality of filter holders, each of the filter holders being mounted with a plurality of optical ND filters having different transmittances and being able to selectively insert the optical ND filters into an incident optical path for an imaging element, each of the plurality of filter holders being able to have the transmittance variably set by switching the optical ND filter to be inserted into the incident optical path, such that, in a case where driving of the plurality of filter holders is required for switching to a target transmittance, the plurality of filter holders to be driven is simultaneously displaced in a same direction by a same displacement amount.

(15)

A program that causes an arithmetic processing device to execute control on a neutral density (ND) filter unit including a plurality of filter holders, each of the filter holders being mounted with a plurality of optical ND filters having different transmittances and being able to selectively insert the optical ND filters into an incident optical path for an imaging element, each of the plurality of filter holders being able to have the transmittance variably set by switching the optical ND filter to be inserted into the incident optical path, such that, in a case where driving of the plurality of filter holders is required for switching to a target transmittance, the plurality of filter holders to be driven is simultaneously displaced in a same direction by a same displacement amount.

REFERENCE SIGNS LIST

1 Main body part
6 ND filter unit
6A, 6B Filter disk
7 Imager unit
8 Main body housing
10 Imaging device
12 Imaging element
13 Camera signal processing unit
16 Display unit
17 Operation unit
30 Camera control unit
32 Filter drive unit

The invention claimed is:

1. An imaging device comprising:

an imaging element;

a neutral density (ND) filter unit including a plurality of filter holders, each of the filter holders being mounted with a plurality of optical ND filters having different transmittances and being able to selectively insert the optical ND filters into an incident optical path for the imaging element; and circuitry configured to variably set the transmittance of each ND filter unit by performing drive control of switching the optical ND filter to be inserted into the incident optical path for each of the plurality of filter holders, and perform, in a case where driving of the plurality of filter holders is required for switching to a target transmittance, control such that the plurality of filter holders to be driven is simultaneously displaced in a same direction by a same displacement amount, wherein the plurality of filter holders includes a first filter holder and a second filter holder with different change widths between transmittances.

2. The imaging device according to claim 1, wherein the plurality of filter holders each have a configuration in which a plurality of optical ND filters is mounted side by side in a circumferential direction and the optical ND filters are selectively inserted into the incident optical path by a rotation operation, and in a case where drive control of the plurality of filter holders is performed for switching to a target transmittance, the circuitry performs control such that the plurality of filter holders to be driven simultaneously rotates in a same rotation direction by a same rotation amount.

3. The imaging device according to claim 2, wherein the first filter holder includes a plurality of optical ND filters in which a change width between transmittances by one level is coarse, the plurality of optical ND filters being arranged in an order of transmittance in a circumferential direction, and the second filter holder includes a plurality of optical ND filters in which a change width between transmittances by one level is dense, the change width being obtained by further dividing the change width between the transmittances by one level of the optical ND filters in the first filter holder into a plurality of levels, the plurality of optical ND filters being arranged in the order of transmittance in a circumferential direction.

4. The imaging device according to claim 3, wherein the circuitry is further configured to change the transmittance by the ND filter unit level by level by performing control of rotating the second filter holder in a state where the first filter holder is fixed and control of simultaneously rotating the first filter holder and the second filter holder in a same rotation direction by a same rotation amount, in a predetermined order.

5. The imaging device according to claim 2, wherein the plurality of filter holders is configured to be endlessly rotatable.

6. The imaging device according to claim 2, wherein the plurality of filter holders each includes a plurality of optical ND filters including a clear filter.

7. The imaging device according to claim 1, wherein, among transmittances that can be set, in a case where the filter holder is driven in an intention of switching to the transmittance located adjacent in an order of transmittance, and in a case where the plurality of filter holders is required to be driven, the circuitry performs control such that the plurality of filter holders to be driven is simultaneously displaced in a same direction by a same displacement amount.

8. The imaging device according to claim 1, wherein, among transmittances that can be set, in a case where the filter holder is driven in an intention of switching to the transmittance not located adjacent in an order of transmittance, and in a case where the plurality of filter holders is required to be driven, the circuitry performs control such that the plurality of filter holders to be driven is simultaneously displaced in a same direction by a same displacement amount.

9. The imaging device according to claim 1, wherein, among transmittances that can be set, in a case where the filter holder is driven in an intention of switching to the transmittance not located adjacent in an order of transmittance, and in a case where the plurality of filter holders is required to be driven, the circuitry individually sets a shortest displacement amount and a displacement direction for the plurality of filter holders to be driven to perform drive control.

10. The imaging device according to claim 1, wherein, among transmittances that can be set, as a control mode in a case where the filter holder is driven in an intention of switching to the transmittance not located adjacent in an order of transmittance, modes can be selected, the modes including a mode in which the plurality of filter holders to be driven is simultaneously displaced in a same direction by a same displacement amount, and a mode in which a shortest displacement amount and a displacement direction for the plurality of filter holders to be driven are individually set to perform drive control.

11. The imaging device according to claim 1, wherein the circuitry is further configured to give an instruction to sequentially switch the transmittance of the ND filter unit in an order of transmittance.

12. The imaging device according to claim 1, wherein the circuitry is further configured to designate a transmittance that can be set by the ND filter unit.

13. The imaging device according to claim 1, wherein each of the filter holders includes a filter disk.

14. A control method comprising:

controlling a neutral density (ND) filter unit including a plurality of filter holders, each of the filter holders being mounted with a plurality of optical ND filters having different transmittances and being able to selectively insert the optical ND filters into an incident optical path for an imaging element, each of the plurality of filter holders being able to have the transmittance variably set by switching the optical ND filter to be inserted into the incident optical path, wherein, in a case where driving of the plurality of filter holders is required for switching to a target transmittance, the plurality of filter holders to be driven is simultaneously displaced in a same direction by a same displacement amount, and wherein the plurality of filter holders includes a first filter holder and a second filter holder with different change widths between transmittances.

15. A non-transitory computer-readable storage medium having embodied thereon a program, which when executed by an arithmetic processing device of a computer causes the computer to execute a method, the method comprising:

controlling a neutral density (ND) filter unit including a plurality of filter holders, each of the filter holders being mounted with a plurality of optical ND filters having different transmittances and being able to selectively insert the optical ND filters into an incident optical path for an imaging element, each of the plurality of filter holders being able to have the transmittance variably set by switching the optical ND filter to be inserted into the incident optical path, wherein, in a case where driving of the plurality of filter holders is required for switching to a target transmittance, the plurality of filter holders to be driven is simultaneously displaced in a same direction by a same displacement amount, and wherein the plurality of filter holders includes a first filter holder and a second filter holder with different change widths between transmittances.

* * * * *